United States Patent
Farmer et al.

(10) Patent No.: US 7,616,901 B2
(45) Date of Patent: *Nov. 10, 2009

(54) COUNTERMEASURES FOR IDLE PATTERN SRS INTERFERENCE IN ETHERNET OPTICAL NETWORK SYSTEMS

(75) Inventors: James O. Farmer, Cumming, GA (US); Alan M. Brown, Roswell, GA (US); John J. Kenny, Suwanee, GA (US); Stephen Thomas, Marietta, GA (US)

(73) Assignee: Enablence USA FTTX Networks Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/002,321

(22) Filed: Dec. 14, 2007

(65) Prior Publication Data
US 2008/0187313 A1 Aug. 7, 2008

Related U.S. Application Data

(63) Continuation of application No. 11/200,873, filed on Aug. 10, 2005, now Pat. No. 7,340,180.

(51) Int. Cl.
*H04B 10/00* (2006.01)
*H04J 14/00* (2006.01)
(52) U.S. Cl. .................................. 398/159; 398/66
(58) Field of Classification Search ............. 398/66, 398/159
See application file for complete search history.

(56) References Cited

U.S. PATENT DOCUMENTS

| | | | |
|---|---|---|---|
| 4,253,035 A | 2/1981 | Amitay | |
| 4,295,005 A | 10/1981 | Daugherty | |
| 4,495,545 A | 1/1985 | Dufresne et al. | |
| 4,500,990 A | 2/1985 | Akashi | |
| 4,654,891 A | 3/1987 | Smith | |
| 4,665,517 A | 5/1987 | Widmer | |

(Continued)

FOREIGN PATENT DOCUMENTS

CA 2107922 4/1995

(Continued)

OTHER PUBLICATIONS

PCT International Written Opinion—PCT/US01/50361, pp. 1-6, Feb. 11, 2004.

(Continued)

*Primary Examiner*—Quan-Zhen Wang
(74) *Attorney, Agent, or Firm*—Sentry Law Group; Steven P. Wigmore

(57) ABSTRACT

Optical networks as defined by the IEEE 802.3ah standard suffer from Stimulated Raman Scattering (SRS) that causes data transmission at a first optical wavelength to interfere with broadcast video transmission at a second optical wavelength in single mode optical fibers. The problem is exacerbated when data is not being transmitted across the network; and instead, an idle pattern transmission is being transmitted in order to keep the network synchronized. The repetitive nature of the idle pattern transmission leads to the SRS optical interference effect. This optical interference effect is mitigated when countermeasures are implemented to modify the idle pattern transmissions or to transmit random data in place of the idle pattern transmissions.

18 Claims, 13 Drawing Sheets

U.S. PATENT DOCUMENTS

| | | |
|---|---|---|
| 4,733,398 A | 3/1988 | Shibagaki et al. |
| 4,763,317 A | 8/1988 | Lehman et al. |
| 4,805,979 A | 2/1989 | Bossard |
| 4,852,023 A | 7/1989 | Lee et al. |
| 4,945,541 A | 7/1990 | Nakayama |
| 4,956,863 A | 9/1990 | Goss |
| 4,975,899 A | 12/1990 | Faulkner |
| 5,105,336 A | 4/1992 | Jacoby et al. |
| 5,132,992 A | 7/1992 | Yurt et al. |
| 5,144,267 A | 9/1992 | West, Jr. |
| 5,179,591 A | 1/1993 | Hardy |
| 5,189,725 A | 2/1993 | Bensell, III et al. |
| 5,247,347 A | 9/1993 | Litteral et al. |
| 5,249,194 A | 9/1993 | Sakanushi |
| 5,253,250 A | 10/1993 | Schlafer et al. |
| 5,253,275 A | 10/1993 | Yurt et al. |
| 5,303,295 A | 4/1994 | West et al. |
| 5,313,546 A | 5/1994 | Toffetti |
| 5,325,223 A | 6/1994 | Bears |
| 5,345,504 A | 9/1994 | West, Jr. |
| 5,349,457 A | 9/1994 | Bears |
| 5,365,585 A | 11/1994 | Puhl et al. |
| 5,365,588 A | 11/1994 | Bianco et al. |
| 5,378,174 A | 1/1995 | Brownlie |
| 5,402,315 A | 3/1995 | Reichle |
| 5,412,498 A | 5/1995 | Arstein et al. |
| 5,432,875 A | 7/1995 | Korkowski et al. |
| 5,469,507 A | 11/1995 | Canetti et al. |
| 5,495,549 A | 2/1996 | Schneider |
| 5,509,099 A | 4/1996 | Hermsen |
| 5,510,921 A | 4/1996 | Takai et al. |
| 5,528,455 A | 6/1996 | Miles |
| 5,528,582 A | 6/1996 | Bodeep |
| 5,534,912 A | 7/1996 | Kostreski |
| 5,541,917 A | 7/1996 | Farris |
| 5,550,863 A | 8/1996 | Yurt et al. |
| 5,557,317 A | 9/1996 | Nishio et al. |
| 5,559,858 A | 9/1996 | Beveridge |
| 5,566,099 A | 10/1996 | Shimada |
| 5,572,347 A | 11/1996 | Burton et al. |
| 5,572,348 A | 11/1996 | Carlson et al. |
| 5,572,349 A | 11/1996 | Hale |
| 5,666,487 A | 9/1997 | Goodman et al. |
| 5,694,232 A | 12/1997 | Parsay et al. |
| 5,701,186 A | 12/1997 | Huber |
| 5,706,303 A | 1/1998 | Lawrence |
| 5,715,020 A | 2/1998 | Kuroiwa et al. |
| 5,731,546 A | 3/1998 | Miles et al. |
| RE35,774 E | 4/1998 | Moura et al. |
| 5,769,159 A | 6/1998 | Yun |
| 5,778,017 A | 7/1998 | Sato et al. |
| 5,790,523 A | 8/1998 | Ritchie, Jr. |
| 5,793,413 A | 8/1998 | Hylton |
| 5,793,506 A | 8/1998 | Schmid |
| 5,799,088 A | 8/1998 | Raike |
| 5,802,089 A | 9/1998 | Link |
| 5,822,102 A | 10/1998 | Bodeep et al. |
| 5,861,966 A | 1/1999 | Ortel |
| 5,867,485 A | 2/1999 | Chambers et al. |
| 5,875,430 A | 2/1999 | Koether |
| 5,880,864 A | 3/1999 | Williams |
| 5,892,865 A | 4/1999 | Williams |
| 5,953,690 A | 9/1999 | Lemon et al. |
| 5,969,836 A | 10/1999 | Foltzer |
| 5,974,063 A | 10/1999 | Yoshida |
| 6,002,692 A | 12/1999 | Wills |
| 6,002,720 A | 12/1999 | Yurt et al. |
| 6,041,056 A | 3/2000 | Bigham et al. |
| 6,097,159 A | 8/2000 | Mogi |
| 6,097,515 A | 8/2000 | Pomp et al. |
| 6,144,702 A | 11/2000 | Yurt et al. |
| 6,151,343 A | 11/2000 | Jurgensen |
| 6,167,553 A | 12/2000 | Dent |
| RE37,125 E | 4/2001 | Carlson |
| 6,215,939 B1 | 4/2001 | Cloud |
| 6,229,701 B1 | 5/2001 | Kung et al. |
| 6,295,148 B1 | 9/2001 | Atlas |
| 6,300,562 B1 | 10/2001 | Daoud |
| 6,330,155 B1 | 12/2001 | Remsburg |
| 6,336,201 B1 | 1/2002 | Geile et al. |
| 6,342,004 B1 | 1/2002 | Lattimore et al. |
| 6,356,369 B1 | 3/2002 | Farhan |
| 6,360,320 B1 | 3/2002 | Ishiguro et al. |
| 6,385,366 B1 | 5/2002 | Lin |
| 6,421,150 B2 | 7/2002 | Graves et al. |
| 6,424,656 B1 | 7/2002 | Hoebeke |
| 6,427,035 B1 | 7/2002 | Mahony |
| 6,452,714 B1 * | 9/2002 | Rollins ........................ 359/325 |
| 6,460,182 B1 | 10/2002 | Buabbud |
| 6,463,068 B1 | 10/2002 | Lin et al. |
| 6,483,635 B1 | 11/2002 | Wach |
| 6,486,907 B1 | 11/2002 | Farber et al. |
| 6,490,727 B1 | 12/2002 | Nazarathy et al. |
| 6,493,335 B1 | 12/2002 | Darcie et al. |
| 6,496,641 B1 | 12/2002 | Mahony |
| 6,507,494 B1 | 1/2003 | Hutchison |
| 6,519,280 B1 | 2/2003 | Cole |
| 6,529,301 B1 | 3/2003 | Wang |
| 6,546,014 B1 | 4/2003 | Kramer et al. |
| 6,577,414 B1 | 6/2003 | Feldman |
| 6,611,522 B1 | 8/2003 | Zheng et al. |
| 6,621,975 B2 | 9/2003 | Laporte et al. |
| 6,654,565 B2 * | 11/2003 | Kenny ........................ 398/182 |
| 6,674,967 B2 | 1/2004 | Skrobko et al. |
| 6,680,948 B1 | 1/2004 | Majd et al. |
| 6,682,010 B2 | 1/2004 | Pohl |
| 6,687,376 B1 | 2/2004 | Yamaguchi |
| 6,687,432 B2 | 2/2004 | Schemmann et al. |
| 6,707,024 B2 | 3/2004 | Miyamoto et al. |
| 6,738,983 B1 | 5/2004 | Rao et al. |
| 6,740,861 B2 | 5/2004 | Matsuda |
| 6,771,614 B1 | 8/2004 | Jones, IV et al. |
| 6,775,137 B2 | 8/2004 | Chu et al. |
| 6,778,785 B2 | 8/2004 | Imajo |
| 6,804,256 B2 | 10/2004 | Chang |
| 6,804,354 B1 | 10/2004 | Driscoll |
| 6,807,188 B1 | 10/2004 | Blahut |
| 6,814,328 B1 | 11/2004 | Li et al. |
| 6,823,385 B2 | 11/2004 | McKinnon, III et al. |
| 6,889,007 B1 | 5/2005 | Wang et al. |
| 6,912,075 B1 | 6/2005 | Ionov et al. |
| 6,961,956 B2 | 11/2005 | Bontempi |
| 6,973,271 B2 | 12/2005 | Farmer et al. |
| 7,007,297 B1 | 2/2006 | Woodward |
| 7,023,871 B2 | 4/2006 | Lind et al. |
| 7,190,901 B2 | 3/2007 | Farmer et al. |
| 7,218,855 B2 | 5/2007 | Whittlesey et al. |
| 7,222,358 B2 | 5/2007 | Levinson et al. |
| 7,227,871 B2 | 6/2007 | Dworkin et al. |
| 7,242,694 B2 | 7/2007 | Beser |
| 7,340,180 B2 * | 3/2008 | Farmer et al. ............... 398/159 |
| 2001/0002195 A1 | 5/2001 | Fellman et al. |
| 2001/0002196 A1 | 5/2001 | Fellman et al. |
| 2001/0002486 A1 | 5/2001 | Kocher et al. |
| 2001/0004362 A1 | 6/2001 | Kamiya |
| 2001/0030785 A1 | 10/2001 | Pangrac et al. |
| 2002/0006197 A1 | 1/2002 | Carroll et al. |
| 2002/0012138 A1 | 1/2002 | Graves |
| 2002/0021465 A1 | 2/2002 | Moore, Jr. et al. |
| 2002/0027928 A1 | 3/2002 | Fang |
| 2002/0039218 A1 | 4/2002 | Farmer et al. |
| 2002/0063924 A1 | 5/2002 | Kimbrough |
| 2002/0063932 A1 | 5/2002 | Unitt et al. |
| 2002/0080444 A1 | 6/2002 | Phillips et al. |

| | | | |
|---|---|---|---|
| 2002/0089725 | A1 | 7/2002 | Farmer |
| 2002/0105965 | A1 | 8/2002 | Dravida et al. |
| 2002/0106178 | A1 | 8/2002 | Bumgarner et al. |
| 2002/0116719 | A1 | 8/2002 | Dapper |
| 2002/0135843 | A1 | 9/2002 | Gruia |
| 2002/0141159 | A1 | 10/2002 | Bloemen |
| 2002/0164026 | A1 | 11/2002 | Huima |
| 2002/0181925 | A1 | 12/2002 | Hodge et al. |
| 2003/0007210 | A1 | 1/2003 | Kenny |
| 2003/0007220 | A1 | 1/2003 | Whittlesey et al. |
| 2003/0011849 | A1 | 1/2003 | Farmer et al. |
| 2003/0016692 | A1 | 1/2003 | Thomas et al. |
| 2003/0048512 | A1 | 3/2003 | Ota |
| 2003/0072059 | A1 | 4/2003 | Thomas et al. |
| 2003/0086140 | A1 | 5/2003 | Thomas et al. |
| 2003/0090320 | A1 | 5/2003 | Skrobko et al. |
| 2003/0128983 | A1 | 7/2003 | BuAbbud |
| 2003/0154282 | A1 | 8/2003 | Horvitz |
| 2003/0189587 | A1 | 10/2003 | White et al. |
| 2003/0194241 | A1 | 10/2003 | Farmer |
| 2003/0206564 | A1* | 11/2003 | Mills et al. ............. 370/528 |
| 2003/0206634 | A1 | 11/2003 | Rose |
| 2003/0223750 | A1 | 12/2003 | Farmer et al. |
| 2004/0028405 | A1 | 2/2004 | Unitt et al. |
| 2004/0086277 | A1 | 5/2004 | Kenny |
| 2004/0131357 | A1 | 7/2004 | Farmer et al. |
| 2004/0141747 | A1 | 7/2004 | Kenny et al. |
| 2004/0161217 | A1 | 8/2004 | Hodge et al. |
| 2004/0199502 | A1 | 10/2004 | Wong et al. |
| 2004/0208565 | A1 | 10/2004 | Roberts et al. |
| 2004/0221088 | A1 | 11/2004 | Lisitsa et al. |
| 2004/0240885 | A1 | 12/2004 | Naoe et al. |
| 2004/0253003 | A1 | 12/2004 | Farmer et al. |
| 2004/0264492 | A1 | 12/2004 | Blahut |
| 2004/0267730 | A1 | 12/2004 | Dumais et al. |
| 2005/0053350 | A1 | 3/2005 | Hodge et al. |
| 2005/0074241 | A1 | 4/2005 | Farmer et al. |
| 2005/0081244 | A1 | 4/2005 | Barrett et al. |
| 2005/0123001 | A1 | 6/2005 | Craven et al. |
| 2005/0125837 | A1 | 6/2005 | Farmer et al. |
| 2005/0175035 | A1 | 8/2005 | Neely et al. |
| 2006/0020975 | A1 | 1/2006 | Kenny et al. |
| 2006/0039699 | A1 | 2/2006 | Farmer et al. |
| 2006/0075428 | A1 | 4/2006 | Farmer et al. |
| 2007/0076717 | A1 | 4/2007 | Limb et al. |

FOREIGN PATENT DOCUMENTS

| | | |
|---|---|---|
| EP | 0566662 | 7/1992 |
| EP | 0713347 | 5/1996 |
| EP | 0720322 | 7/1996 |
| EP | 0955739 | 11/1999 |
| EP | 0933892 | 10/2003 |
| JP | 07-020327 | 1/1995 |
| JP | 10-020123 | 1/1998 |
| JP | 11-305052 | 11/1999 |
| JP | 4-504433 | 3/2002 |
| MX | 180038 | 11/1995 |
| TW | 72821 | 8/2005 |
| WO | WO 01/27940 | 4/2001 |
| WO | WO 02/30019 | 4/2002 |
| WO | WO 02/30020 | 4/2002 |
| WO | WO 02/060123 | 8/2002 |
| WO | WO 03/001737 | 1/2003 |
| WO | WO 03/005611 | 1/2003 |
| WO | WO 03/005612 | 1/2003 |
| WO | WO 03/019243 | 3/2003 |
| WO | WO 03/021820 | 3/2003 |
| WO | WO 03/023980 | 3/2003 |
| WO | WO 03/079567 | 9/2003 |
| WO | WO 03/090396 | 10/2003 |
| WO | WO 2006/014433 | 2/2006 |
| WO | WO 2006/020538 | 2/2006 |
| WO | WO 2006/041784 | 4/2006 |

OTHER PUBLICATIONS

PCT International Search Report—PCT/US05/28020, p. 1, Nov. 8, 2006.
PCT Written Opinion—PCT/US01/21298, p. 1, May 6, 2003.
The International Engineering Corporation, Marconi—Fiber to the Home, www.iec.org, pp. 1-10.
Tian et al., Raman Crosstalk in Fiber-Optic Hybrid CATV Systems with Wide Channel Separations, *IEEE Photonics Technology Letters*, vol./Iss: 16(1), pp. 344-346, Jan. 1, 2004.
"Trading Update and Operational Review Presentation" Marconi, Sep. 4, 2001, pp. 1-35.
"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Fiber to the Home" International Engineering Consortium (no date) pp. 1-10, available at www.iec.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, May 2000, 5pgs.
"Deep Fiber HFC: A Next-Generation Integrated Access Solution Offering Significant Improvement Over Traditional HFC Architectures" Marconi Corporation PLC, May 2000, 8 pgs.
"A Gold Mine of Opportunities in the Face of Increasing Competition: Choices for Utilities Entering the Communications Marketplace" Marconi Corporation PLC, May 2000, 6 pgs.
"Fiber Optics on New Development MDUs: A Research Summary," Marconi Corporation PLC, May 2000 5 pgs.
"Thermal Management Challenges: Small ONU Enclosures," Marconi Corporation PLC, May 2000, 9 pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
Khoe, G. et al., "Coherent Multicarrier Technology for Implementation in the Customer Access," IEEE, May/Jun. 1993, pp. 695-713.
Linnell, L. "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
Gaglianello, B., "An Efficient MAC Layer Protocol for EPON," IEEE 802.3 EFM Nov. 2001, 9 pgs.
"Policing and Shaping Overview" *Quality of Service Solutions Configuration Guide*, Cisco Systems, Inc. (No Date).
Cisco IOS™ Software Quality of Service Solutions, Cisco Systems, Inc. 1998, 28 pgs.
International Search Report for PCT/US01/21298, 2 pgs, mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 www.gigabit-ethernet.org.

"eLuminant—Asynchronous Transfer Mode (ATM) Passive Optical Networks (PONS) Tutorial" 28 pgs, International Engineering Consortium, 2000 at www.iec.org.

International Search Report dated Dec. 4, 2002 for PCT/US02/27398.

International Search Report dated Dec. 17, 2002 for PCT/US02/15861.

Global Access™, Universal Services Gateway, USG100, ARRIS, pp. 1-2, Oct. 18, 2002.

Global Access™, Universal Access Switch, UA4024, ARRIS, pp. 1-2, Aug. 28, 2002.

Partial International Search Report dated Jan. 3, 2003 for PCT/US01/31032.

International Search Report dated Apr. 22, 2003 for PCT/US01/50361.

Zhang, L. et al., "Label-switching architecture for IP traffic over WDM networks", IEE Proc.-Commun., vol. 147, No. 5, Oct. 2000, pp. 269-275.

Masip-Torne, J. et al., "Providing Differentiated Service Categories in Optical Packet Networks", Proceedings of the International Teletraffic Congress, 1999. ITC-16. Teletraffic Engineering in a Competitive World. Edinburgh, UK, Jun. 7-11, 1999, Teletraffic Science and Engineering Amsterdam: Elsevier, NL, vol. 3B, Jun. 7, 1999, pp. 1115-1126.

Bannister, J. et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

Yang, O.W.W. et al. , "All-Optical WDM/TDM Star-Bus Network Using Optical Amplifiers", Journal of Optical Communications, Fachverlage Schiele & Schon, Berlin, DE, vol. 16, No. 6, Dec. 1, 1995, pp. 216-226.

Ciciora , Walter et al., "Modem Cable Television Technology: Video, Voice, and Data Communications", © 1999 by Morgan Kaufman Publishers Inc., pp. 167-176.

International Search Report dated Apr. 21, 2003 for PCT/US02/28734.

International Search Report dated Jul. 2, 2003 for PCT/US03/07814.

Angelopoulos J.D. et al, "A Transparent Mac Method for Bandwidth Sharing and CDV Control at the ATM Layer of Passive Optical Networks", Journal of Lightwave Technology, IEEE. New York, US, vol. 14, No. 12, Dec. 1, 1996, pp. 2625-2634, XP000642251 ISSN: 0733-8724.

Optical Networks Daily, A Publication of Optical Keyhole, Aug. 26, 2003, pp. 1-13.

International Search Report dated Jul. 7, 2003 for PCT/US01/51350.

International Search Report dated Oct. 3, 2003 for PCT/US03/12231.

Glaesemann, G. et al., "The Mechanical Reliability of Corning® Optical Fiber in Bending White Paper," Sep. 2002, pp. 1-4.

Corning® SMF-28™ Optical Fiber Product Information, Corning® Single-Mode Optical Fiber, Apr. 2002, pp. 1-4.

Bourne, J. "Heathrow—Experience and Evolution" IEEE. 1990, pp. 1091-1095.

Miki, T. "A Design Concept on Fiber-Optic Wavelength-Division-Multiplexing Subscriber Loop System" WTG—Fachber. 1980, pp. 41-45.

Yamaguchi, K. "A Broadband Access Network Based on Optical Signal Processing: The Photonic Highway" IEEE. 1990, pp. 1030-1037.

Ciciora, Walter S. et al., "Modern Cable Television Technology: Video, Voice, and Data Communications", © 1999, pp. 162-214, Chapter 4, Morgan Kaufmann Publishers, Inc., San Francisco, California.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the Home or Curb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

McDevitt, F.R., Switched vs. Broadcast Video for Fiber-to-the-Home Systems, Communications 1990. ICC 90, Including Supercom Technical Sessions. SUPERCOMM/ICC '90. Conference Record, IEEE International Conference on, Apr. 16-19, 1990.

Mangum, K.: Ko, D. Subscriber Loops and Services, 1988. Proceedings, ISSLS 88., International Symposium on, Sep. 11-16, 1988 pp. 208-212.

Han et al., Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Effenberger et al., "G.983.VideoReturnPath," Oct. 2004, International Telecommunication Union, Telecommunication Standardization Sector, Study Group 15—Contribution 13, pp. 1-18.

Fludger et al., "Pump to Signal RIN Transfer in Raman Fiber Amplifiers", Journal of Lightwave Technology, IEEE, New York, US, vol. 19, No. 8, Dec. Aug. 2001, pp. 1140-1148, ISSN: 0733-8724.

"Spectral Grids for WDM Applications: CWDM Wavelength Grid", International Telecommunication Union, ITU-T, Rec. G.694.2, Dec. 2003, pp. i-iii and pp. 1-4.

International Preliminary Examination Report of Nov. 19, 2003 for PCT/US03/07814.

International Preliminary Report on Patentability of Apr. 1, 2005 for PCT/US01/51350.

International Preliminary Examination Report of Sep. 17, 2004 for PCT/US03/12231.

International Search Report dated Apr. 18, 2006 for PCT/US05/23847.

International Search Report dated Oct. 25, 2006 for PCT/US05/35512.

International Search Report dated Feb. 6, 2007 for PCT/US05/46419.

International Search Report dated Feb. 21, 2007 for PCT/US06/11159.

Perkins, Brian, "The Art of Overlaying Video Services on a BPON," 2004, Bechtel Corporation, pp. 1-9.

* cited by examiner

Data Service Hub 400

Data Service Hub 400

US 7,616,901 B2

COUNTERMEASURES FOR IDLE PATTERN SRS INTERFERENCE IN ETHERNET OPTICAL NETWORK SYSTEMS

STATEMENT REGARDING RELATED APPLICATIONS

This application is a continuation of and claims priority to application Ser. No. 11/200,873 filed Aug. 10, 2005, now U.S. Pat. No. 7,340,180 entitled "Countermeasures for Idle Pattern SRS Interference in Ethernet Optical Network Systems," the entire contents of which are incorporated by reference.

FIELD OF THE INVENTION

The present invention relates to countermeasures that can be used to mitigate the effects of Stimulated Raman Scattering (SRS) that causes data transmission propagated at a first optical wavelength to interfere with broadcast video transmission propagated at a second optical wavelength in optical waveguides used in optical networks. More particularly described, the present invention relates to modifying idle transmission patterns or transmitting random data to a nonexistent MAC address to decrease the SRS optical interference and improve the quality of video transmissions.

BACKGROUND OF THE INVENTION

The Institute of Electrical and Electronics Engineers (IEEE) has defined the 802.3ah Ethernet in the First Mile (EFM) Point-to-Multipoint standard for Ethernet-based Passive Optical Networks (EPONs). These networks can act as optical access networks for residential and business subscribers, providing a full range of communications services to those users. Consistent with such deployments, the IEEE 802.3ah standard specifies optical wavelengths that leave room or capacity for communication services other than Ethernet, particularly broadcast video.

Unfortunately, key characteristics of Ethernet data transmission can cause significant optical interference to video signals through a phenomenon known as Stimulated Raman Scattering (SRS). The IEEE 802.3ah standard specifies that Ethernet data is transmitted to the subscriber using the 1490 mn optical wavelength. Wavelength division multiplexing (WDM) permits an optical network using the 1490 nm optical wavelength to propagate data to also deliver broadcast video on the same optical fiber using the 1550 nm optical wavelength. When the network transmits on two optical wavelengths simultaneously, such as the 1490 nm and 1550 nm wavelengths, it can be vulnerable to SRS. In IEEE 802.3ah EPON networks, the Ethernet signal transmitted at 1490 nm amplifies any video signal transmitted at 1550 nm, and therefore interference can result in a noticeable degradation of video quality. A particularly egregious case occurs when an Ethernet idle pattern is transmitted because no data is available to transmit. This causes extreme interference with broadcast video on certain channels.

FIG. 1 illustrates a conventional PON network 100 that is subject to SRS. Signals originate at a data service hub 110 and are transported on a passive optical network (PON) 120. The PON 120 comprises optical fibers 160 and 150, and an optical tap, or splitter 130, which divides the signals between a plurality of Subscriber Optical Interfaces 140. The Subscriber Optical Interfaces 140 are placed on the premises of each subscriber where they convert optical signals into the electrical domain in order to deliver video, voice, and data services to that subscriber. The PON 120 comprises a trunk fiber 160, which carries optical signals to a plurality of subscribers, and a drop fiber 150, which carries optical signals to a single subscriber. In some instances there can be an intermediate fiber which follows a portion of the optical splitting.

SRS between optical signals can develop in the trunk fiber 160, and is a function of the signal levels and optical wavelengths used. The amount of SRS optical interference introduced is a complex function of the distance 170 to the split. Very short lengths of optical fiber are not susceptible to SRS, but trunk fibers 160 of practical length tend to be quite susceptible to SRS. The IEEE 802.3ah EFM standard specifies distances of 10 and 20 km, which can be all in the Trunk Fiber 160, or some portion can be after the split, in the drop fiber 150. The worst case situation is where all the fiber is in the trunk portion 160. The IEEE 802.3ah standard also specifies the signal levels to be used.

FIG. 2 illustrates the related phenomenon of noise when a random signal is optically transmitted over a fiber, as it would manifest itself in a worst-case IEEE 802.3ah system. FIG. 2 illustrates the frequency spectrum of optical video signals. When an Ethernet idle pattern is transmitted, the signal power becomes concentrated at a few frequencies rather than being spread out evenly across the entire bandwidth as is the case illustrated in FIG. 2. This means that the idle pattern will affect fewer channels, but the effect will be much greater on those channels.

The curve plots the effect of SRS on an optical system carrying random data and also analog video. Better performance is reflected at higher points on the graph. The effect of random data is to worsen the carrier-to-noise ratio (C/N) of the received optical signal, to well below acceptable levels. The curve plots the C/N on each lower-frequency channel where the problem is the worst for a family of PONs of different practical lengths.

The figure also illustrates C/N limits for cable TV good engineering practice 220 and typical Fiber-to-the-Home (FTTH) typical performance absent SRS 210. If SRS causes the C/N to get significantly worse than the C/N without it 210, then the performance of the optical system will be degraded and users will not perceive the benefits that FTTH is supposed to offer. PONs with distances to the split 170 of 2 km 230, 5 km 240, 10 km 250 and 20 km 260 are shown. From this curve, one can see that a 2 km distance will not drop the C/N below cable TV good engineering practices 220, but it will be close at the lowest channel, and the performance will be worse than what a FTTH system should deliver. Longer PONs will cause unacceptable C/N performance on several channels.

One of ordinary skill in the art knows that a different selection of optical wavelengths could reduce or effectively eliminate the problem introduced by SRS. For example, other FTTH systems are known which use 1310 nm for bidirectional transmission of data. These systems are usually not troubled by SRS. However, the IEEE 802.3ah standard requires that downstream data be transmitted at 1490 nm, where the problem exists. It is possible to move the wavelength of the video transmission as high as possible in the 1550 nm window, but this will only result in slight improvement.

One of ordinary skill in the art is familiar with the specification for Gigabit Ethernet, which requires a prescribed bit pattern to be transmitted as an idle pattern when there is no data available to be transmitted. This method used in gigabit Ethernet and in certain other applications, is called 8B/10B encoding. The purpose of the 8B/10B encoding is to remove the low frequency dc component that digital optical systems are not able to transmit and to ensure clock synchronization to prevent the clock from wandering out of phase, which can damage data recovery. In 8B/10B encoding, for every 8 bits (one byte), a 10 bit code is substituted. The substituted 10 bit code is chosen to have very close to an equal number of 1s and 0s and three to eight transitions per symbol. The codes satisfy the requirement of no dc component in the signal, and the large number of transitions ensure clock synchronization. Furthermore, since a limited number of the available codes are used, the encoding provides another way to detect transmission errors.

The downside of 8B/10B encoding is that because 10 bits must be transmitted to represent 8 bits, the bandwidth required is increased by 25%. For instance, in a gigabit Ethernet system, the desired data is transmitted at 1 Gb/s, but because of 8B/10B encoding, the data rate on the fiber (the so-called wire rate) is 1.25 Gb/s. Furthermore, it has been found that when the idle pattern is transmitted and encoded with 8B/10B encoding, the resulting signal has strong power concentration at certain frequencies. These frequencies for Gigabit Ethernet happen to be at 62.5 MHz and all harmonics thereof, with the odd harmonics having virtually all of the power.

The IEEE 802.3ah standard defines two different idle codes. The first idle code, referred to as /I1/, has two versions. One version changes the running disparity on the link from positive (a preponderance of 1s—designated as /I1+/) to negative (a preponderance of 0s—designated as /I1−/), while the second version changes the running disparity from negative to positive. As known to one or ordinary skill in the art, the running disparity rules change the transmitted value from one column to the other based on certain rules related to the number of 1s or 0s that have been transmitted in the previous code group. These rules ensure that there is no dc content in the optical signal and that there is not a long string of like binary digits, thus ensuring reliable clock recovery.

The second idle code, referred to as /I2/, maintains the existing running disparity on the link. In a normal procedure for using these two idle codes the systems performs one of the following: (a) If, after the last transmitted frame, the link has a positive running disparity, the system transmits one /I1+/ to reverse the running disparity, and then transmits /I2/ continuously or (b) if, after the last transmitted frame, the link has a negative running disparity, the system transmits /I2/ continuously.

FIG. 3 is illustrates a measured spectrum 300 of a Gigabit Ethernet signal when it is carrying an idle pattern in the conventional art. On the spectrum 300, frequency in MHz is plotted along the x-axis, and relative amplitude in decibels (dB) along the y-axis. The amplitude scale shows increments of 10 dB. Note the strong presence of odd harmonics of 62.5 MHz. When this pattern is optically transmitted downstream in a network over an optical waveguide such as the one shown in FIG. 1, the SRS optical interference will cause very severe crosstalk in the video channels at these frequencies. The lowest frequency, 62.5 MHz, is of particular concern, as the worst SRS crosstalk usually occurs at lower frequencies such as this. Television channel 3 occupies this spectrum on the video layer. Its picture carrier is at 61.25 MHz (as prescribed by FCC frequency allocations), so the interference caused by the idle pattern appears 1.25 MHz above the picture carrier. One or ordinary skill in the art knows that this is a frequency at which the signal is particularly sensitive to interference. The interference will show up as a "beat," or moving (usually) diagonal stripes in the picture.

In view of the foregoing, there is a need in the art to mitigate the effects of SRS optical interference on video transmissions in optical networks that use the IEEE 802.3ah data standard. Particularly, a need exists in the art for reducing or substantially eliminating the optical interference between data transmitted on a first optical wavelength and video information transmitted on a second optical wavelength when the data and video information are propagated along the same optical waveguide.

SUMMARY OF THE INVENTION

The present invention can mitigate the effects of SRS optical interference in optical networks between data transmitted at a first optical wavelength, such as 1490 nm, and video information transmitted at a second optical wavelength, such as 1550 nm. Specifically, the present invention can substantially reduce or eliminate SRS optical interference produced by idle transmission patterns generated in accordance with the IEEE 802.3ah data standard that are propagated at 1490 nm and that can interfere with video information propagated at 1550 nm. The invention can reduce or substantially eliminate SRS optical interference in optical networks by modifying the idle transmission pattern or transmitting random data to a non-existent MAC address.

One exemplary aspect of an optical network system embodying the invention can be described as follows: Data signals can be received by a tap routing device from different data sources including telephone switches or internet routers. These data signals can then eventually be transmitted at a first optical wavelength to a plurality of subscriber optical interfaces which are located on the premises of subscribers. Video information such as broadcast video can be transmitted at a second optical wavelength along the same optical waveguide of the data signals to the plurality of subscriber optical interfaces.

For data sent to subscribers downstream along the optical waveguide according to a standard that requires idle patterns, such as the IEEE 802.3ah data standard, and when no data signals are being transmitted, the tap routing device can transmit ten-bit idle patterns downstream. An idle pattern replacement device can monitor the downstream data of the tap routing device in the electrical domain and can detect when the idle patterns are being transmitted. In response to the transmission of an idle pattern in the electrical domain or the absence of data, the idle pattern replacement device can generate substitute data in the electrical domain to replace the idle pattern that is produced according to the data standard, such as the IEEE 802.3ah standard. The substitute data in the electrical domain may then be converted into the optical domain and then transmitted at the first optical wavelength along with the video information at a second optical wavelength to the plurality of subscriber optical interfaces.

According to one exemplary aspect of the present invention, the idle pattern replacement device can generate substitute data in the electrical domain by generating non-repetitive random data and transmitting it to a non-existent MAC address. First, the idle pattern replacement device can create a predetermined Ethernet header based on a group of non-existent MAC addresses. Next, the idle pattern replacement device can generate forty bytes of random data. Finally, the cyclical redundancy check (CRC) can be calculated from the previously created Ethernet header and random data and the entire Ethernet frame can be transmitted to the optical transmitter. The optical transmitter can then convert data generated in the electrical domain into the optical domain for optical transmission over a waveguide. The generation of substitute data in the electrical domain can reduce any electrical interference between data and video signals in the electrical domain. And when the substitute data is converted to the optical domain, the substitute data can reduce any optical interference between data and video signals in the optical domain.

For another exemplary aspect of the invention, an idle pattern replacement device can reduce the effect of SRS between optical signals by modifying the normal idle transmission pattern. As previously discussed, SRS optical interference is caused by the repetition of the normal idle transmission pattern. In accordance with an exemplary aspect of the present invention, an alternative idle transmission pattern may be transmitted in the electrical domain to break up the normal idle transmission pattern of sending a repetitive pattern. The increased randomness of this pattern after it is converted to the optical domain can reduce the effect of SRS while still conforming to the specifications of the IEEE standard.

For another exemplary aspect of the invention, non-repetitive random data can be generated and then transmitted to a non-existent MAC address using an idle pattern replacement device comprising a CPU, a Layer 2 (L2) switch fabric, and an EPON chip. As is understood by one of ordinary skill in the art, L2 refers to the second layer of the ISO seven layer data transmission model, and specifically is where Ethernet is implemented. Ethernet implementations are usually done using a combination of hardware and software. The term "switch fabric" refers to the combination of hardware and software that allows data packets to be switched from one of a plurality of inputs to one of a plurality of outputs. In this aspect of the invention, the Ethernet frame data can be assigned an associated priority value. A CPU, or other special circuitry, can continuously transfer random data frames in the electrical domain to the L2 switch fabric with the lowest priority value. When the L2 switch fabric receives real data from the logic interface, data in the electrical domain can be immediately transferred to the tap routing device while the random data frames can be dropped. However, when the L2 switch fabric stops receiving real data and no data is being transmitted, the random data frames can be made available and can be transmitted to the tap routing device in place of the normal idle patterns. The optical transmitter that follows the tap routing device and tap multiplexer can convert any data in the electrical domain into the optical domain for optical transmission.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
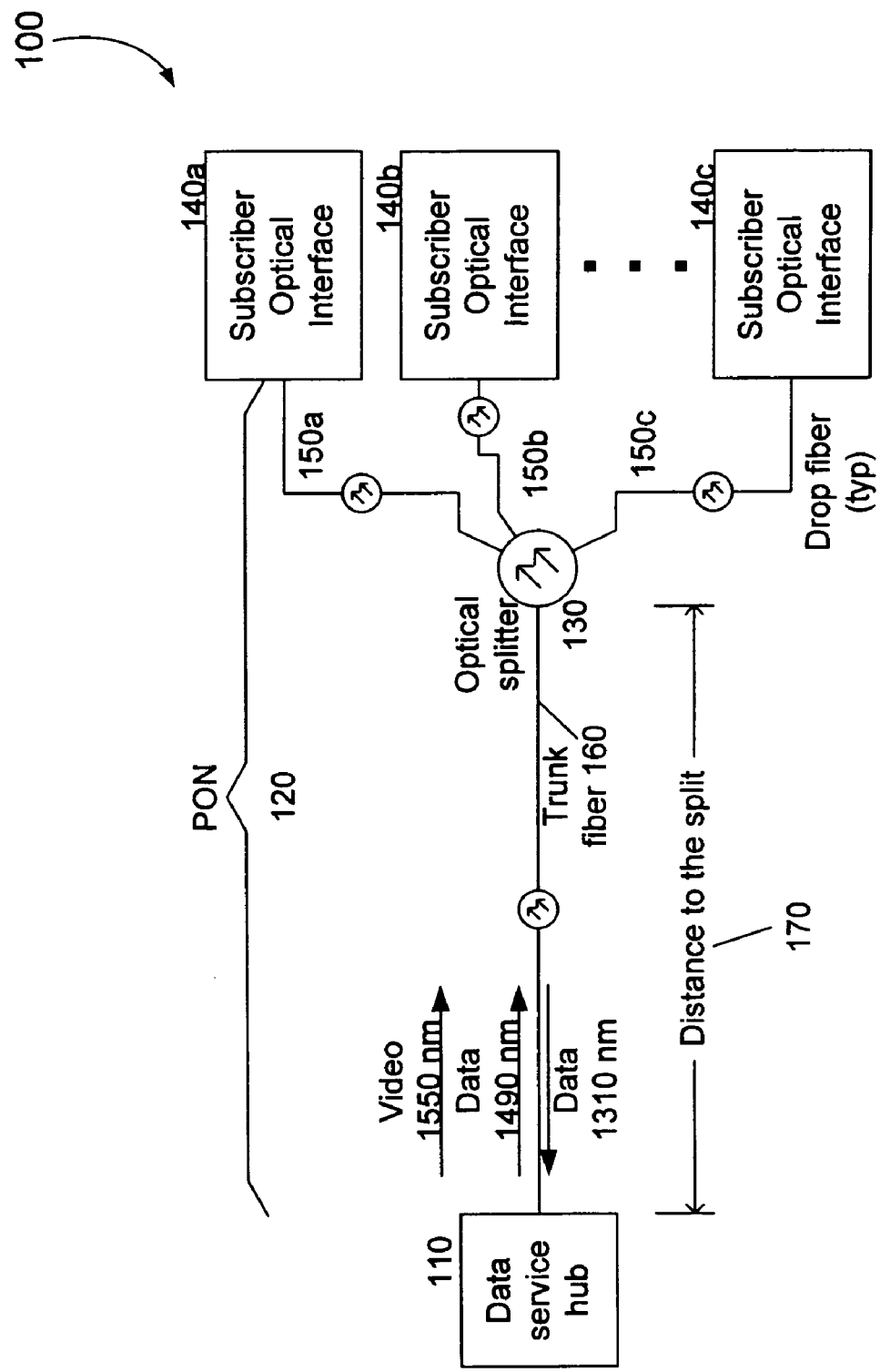
FIG. 1 is a block diagram illustrating the operating environment of a conventional PON network that is subject to SRS.
Figure 2:
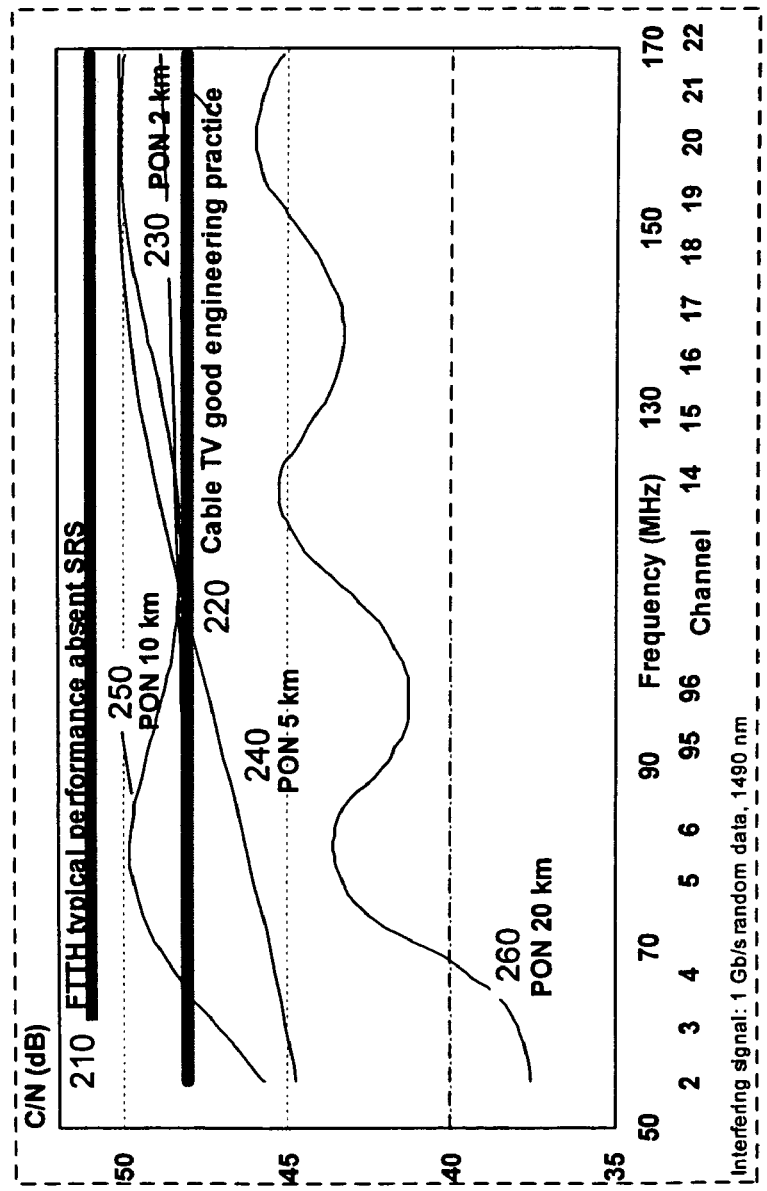
FIG. 2 is a graph illustrating the phenomenon of SRS optical interference for a conventional analog video transmission.
Figure 3:
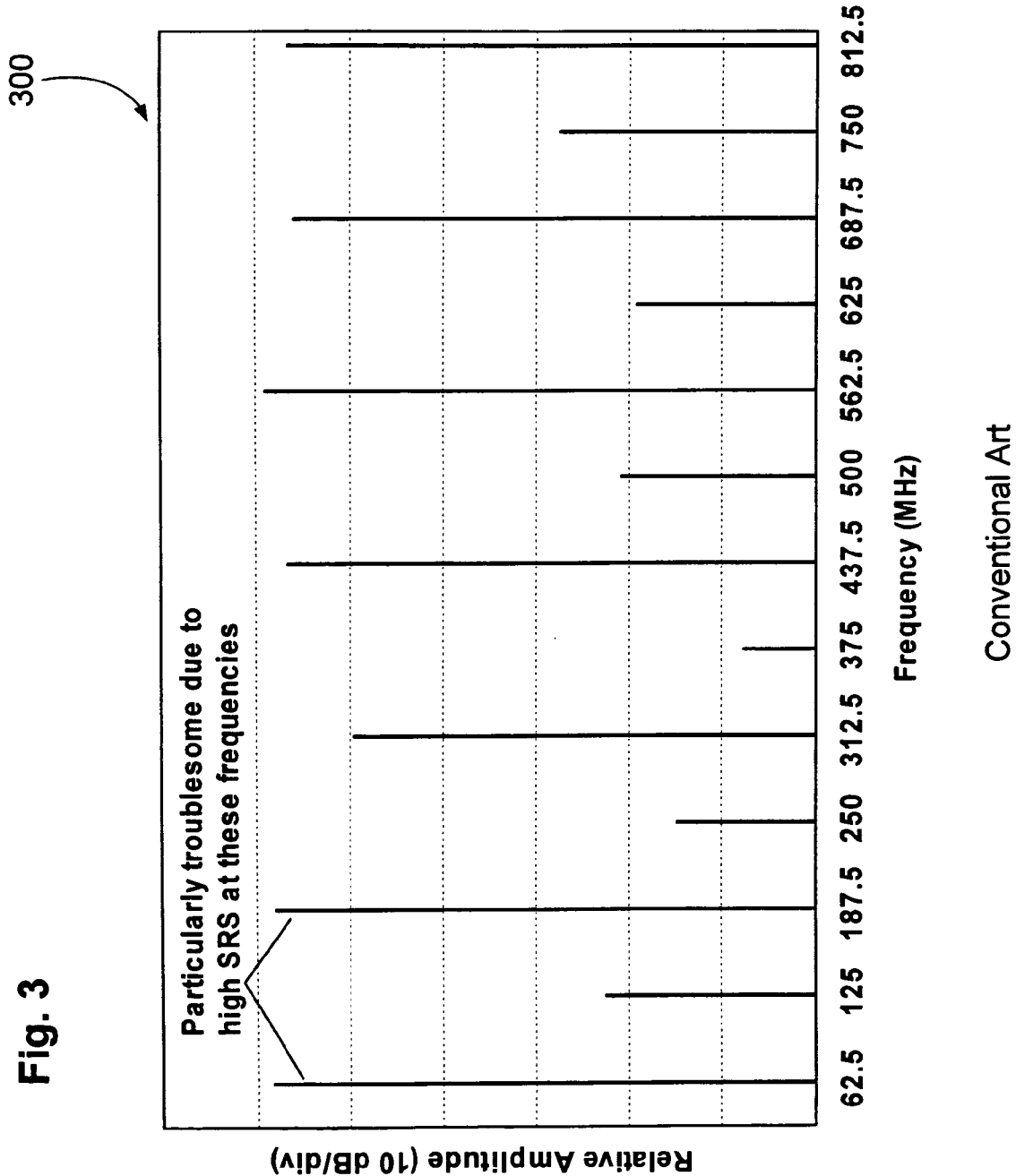
FIG. 3 is a graph illustrating the spectrum of a conventional Gigabit Ethernet optical signal comprising an idle pattern with 8B/10B encoding.

The present invention relates to mitigating SRS optical interference between data propagated at a first optical wavelength and video information propagated at a second optical wavelength on the same waveguide. More specifically, the invention relates to improving the quality of video transmissions on a optical network by modifying idle transmission patterns or transmitting random data to a non-existent MAC address when data is transmitted according to a data standard at a first optical wavelength and when the video information is transmitted on a second optical wavelength.

In an exemplary embodiment of the present invention, an idle pattern replacement device can monitor the downstream data stream of a tap routing device in the electrical domain in order to detect the idle patterns that the routing device generates and that cause SRS optical interference between the optical data signals and optical video signals propagated at two different optical wavelengths. To mitigate the SRS optical interference, the idle pattern replacement device generates non-repetitive substitute data in the electrical domain to take the place of the previously generated repeating or constant idle patterns. The idle pattern replacement device accomplishes this goal by modifying the idle transmission patterns or transmitting random data to a non-existent MAC address. The substitute data of the idle pattern replacement device can be converted from the electrical domain to the optical domain and then optically transmitted to subscriber optical interfaces at a first optical wavelength that is different than a second optical wavelength used to carry video information.

Referring now to the drawings, in which like numerals represent like elements, aspects of the exemplary embodiments will be described in connection with the drawing set.

Figure 4A:
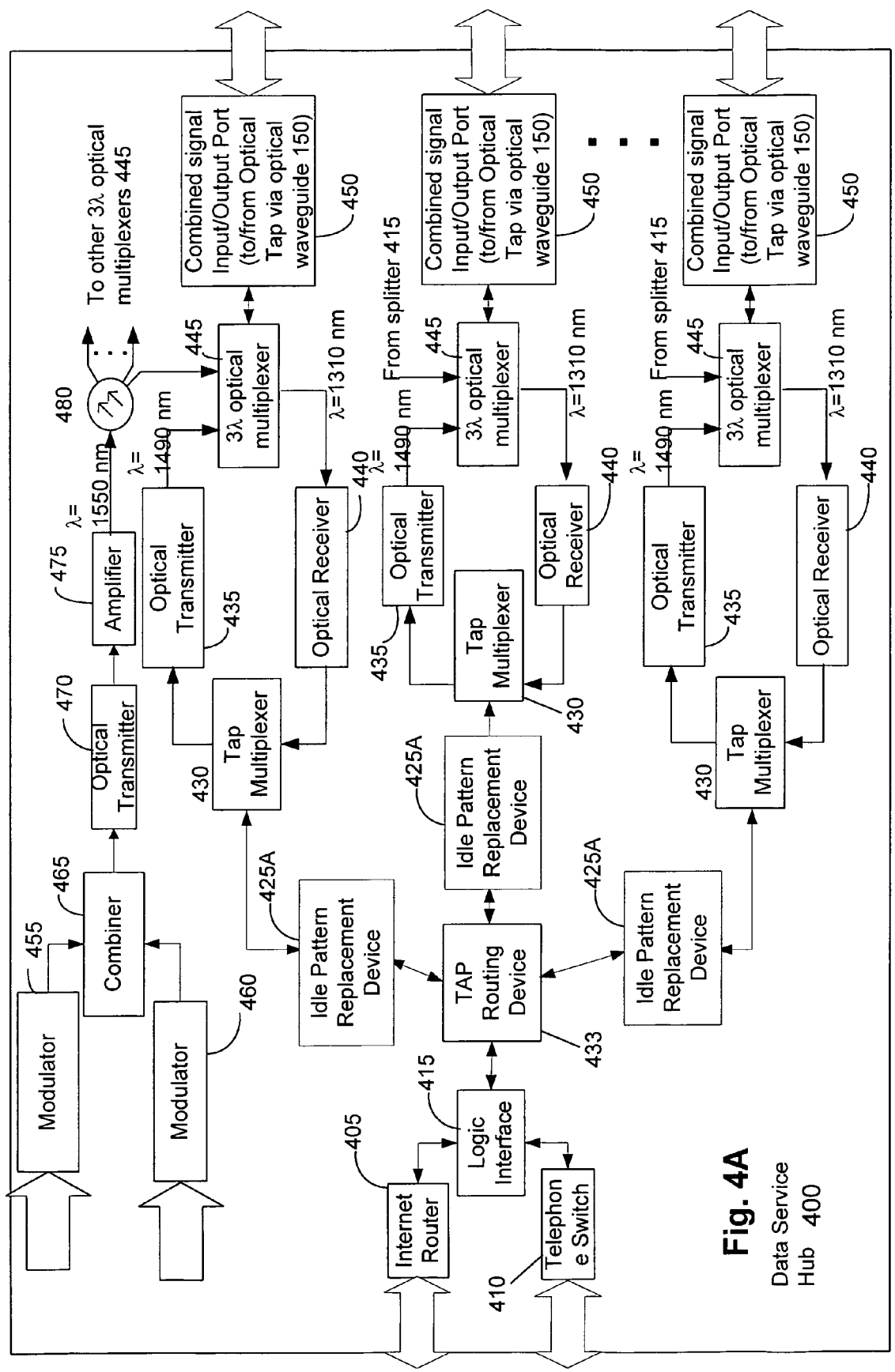
FIG. 4A is a block diagram illustrating the operating environment of a data service hub in accordance with an exemplary embodiment of the present invention.

FIG. 4A is a block diagram illustrating the operating environment of a data service hub 400 in accordance with an exemplary embodiment of the present invention. Data is received by a logic interface 415 that is connected to data sources such as a telephone switch 410 and an Internet router 405. The logic interface 415 can be connected to other data sources/sinks that are not illustrated.

The logic interface 415 is also connected to a tap routing device 433. The tap routing device 433 can comprise a commercial chip that implements the IEEE 802.3ah standard by using 8B/10B encoding on the incoming data. Therefore, the tap routing device 433 can transmit idle code patterns when no data is received from the logic interface 415. Alternatively the 8B/10B encoding may be added at the tap multiplexer 430, as discussed below. The 8B/10B encoding process includes steps in which each 8-bit word of data is replaced with a specified 10-bit symbol. According to one exemplary embodiment, the tap routing device 433 sends the downstream data to a plurality of tap multiplexers 430. The tap multiplexer 430, that can comprise a Serializer/Deserializer (SERDES), divides the signal among a plurality of subscriber optical interfaces, and it handles serialization of data. In some exemplary embodiments, the tap multiplexer 430 can produce idle pattern codes. Usually when the tap multiplexer 430 has the capability to produce idle pattern codes, the tap routing device 433 does not.

In order to minimize the speed at which electrical circuits must operate, the data signals through the tap routing device are often handled in parallel. That is, a signal path that is, usually, 8, 16, 32, or 64 bits wide handles the signals, with many bits being handled on different wires at the same time. For example, if a data processing element is 32 bits wide, it handles 32 bits simultaneously on 32 wires, but the data rate on any one wire is only 1/32 of the overall data rate. However, before the signal can be supplied to the fiber optic optical transmitter 435, it must be converted to a faster serial data on a single wire, since there is only one optical transmitter 435 and one fiber optic cable to handle data to each group of subscriber optical terminals. This is the purpose of the serialization portion of the SERDES, to convert the parallel paths to a single serial path. At the same time, the 8B/10B encoding may be added. The deserialization portion of the SERDES operates on the received signal coming in from Optical Receiver 440, converting from serial to parallel format. This process is understood by one of ordinary skill in the art.

The tap multiplexer 430 can also add idle code patterns when no input data is available. The plurality of tap multiplexers 430 are connected to a plurality of optical transmitters 435 and optical receivers 440. The optical transmitters 435 can comprise can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the invention. The optical receivers 440 can comprise one or more photoreceptors or photodiodes that convert optical signals into electrical signals. According to one exemplary embodiment, when downstream data to subscribers is transmitted according to a standard, such as the IEEE 802.3ah standard, the optical transmitters 435 transmit downstream data at a wavelength of approximately 1490 nm. Meanwhile, the optical receivers 440 receive upstream data on a wavelength of 1310 nm.

Further describing FIG. 4A, broadcast video signals are modulated on RF carriers with modulators 455 and 460, whose outputs are combined in combiner 465. According to one exemplary embodiment, there can be over one hundred modulators 455, 460 (not illustrated). The combined RF signals can be used to modulate a 1550 nm optical signal in optical transmitter 470, whose output is amplified if necessary in amplifier 475. Splitter 480 divides the optical signal among all outputs, supplying a portion of the signal to respective three wavelength optical multiplexers 445.

Each optical multiplexer 445 combines the downstream data of a first optical wavelength, such as 1490 nm, with the downstream video broadcast signals of a second optical wavelength, such as 1550 nm. Each optical multiplexer 445 also separates the upstream data signals sent on a third optical wavelength, such as 1310 nm, from the downstream optical signals. Each optical multiplexer 445 sends the upstream data signals sent using the third wavelength to respective optical receivers 440.

Even though the tap multiplexer 430 and the 3λ optical multiplexer 445 share similar nomenclature, and even though their functions are somewhat analogous, the two devices work much differently. As is understood by one of ordinary skill in the art, a multiplexer is any device that combines two or more signals. The tap multiplexer 430 works in the electrical domain to combine signals to and from the optical transmitter 435 and the optical receiver 440. On the other hand, 3λ optical multiplexer 445 operates in the optical domain, and combines downstream signals from optical transmitter 435 and splitter 480, with upstream signals transmitted to optical receiver 440. In essence, the 3λ optical multiplexer 445 is the device that directs the three optical signals in the appropriate directions.

Optical signals entering and leaving the data service hub 400 are interfaced by way of the combined signal Input/Output ports 450 that are coupled to respective optical waveguides 160. The optical waveguides 160 are connected to optical taps or splitters as illustrated in FIG. 1.

In an exemplary embodiment of the present invention, as illustrated in FIG. 4A, multiple idle pattern replacement devices 425A are connected between the tap routing device 433 and the tap multiplexers 430. Each idle pattern replacement device 425A monitors the downstream electrical output of the tap routing device 433.

In an exemplary embodiment of the present invention, the idle pattern replacement device 425A monitors this electrical data and when it detects either an idle pattern or no data, it inserts substitute data that is later converted from the electrical domain into the optical domain at a first optical wavelength in order to avoid SRS optical interference between downstream optical data signals at the first optical wavelength and downstream video signals at a second optical wavelength. The downstream optical data signals and downstream optical video signals are sent through the combined signal input/output port 450 over an optical waveguide 160 to optical splitters 130.

In an exemplary embodiment of the present invention, the tap routing device 433, idle pattern replacement device 425A, and tap multiplexer 430 may all be incorporated on a single commercial chip.

Figure 4B:
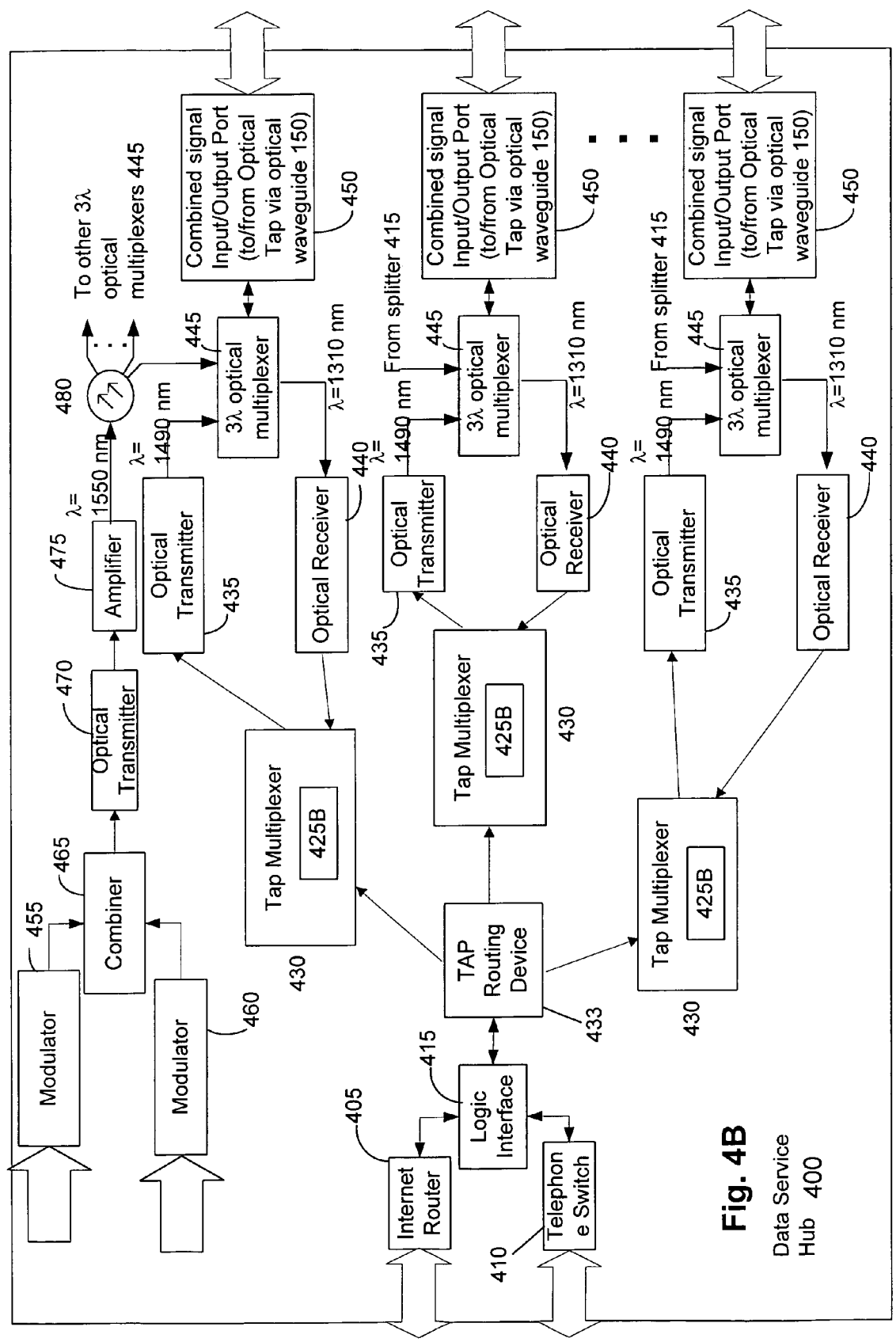
FIG. 4B is a block diagram illustrating the operating environment of a data service hub in accordance with an alternative exemplary embodiment of the present invention.
Figure 9:
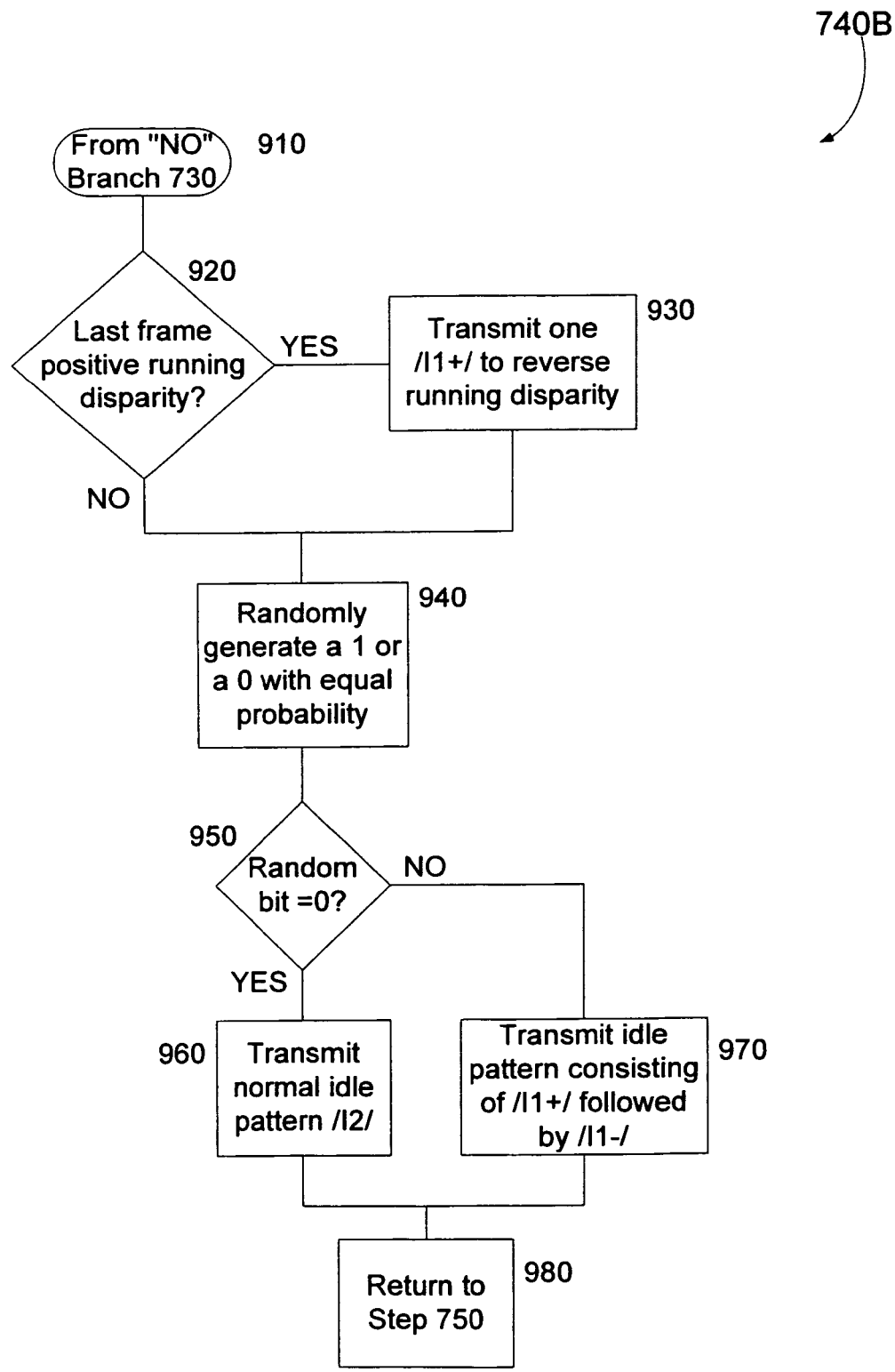
FIG. 9 is a logic flow diagram illustrating an exemplary method for reducing the effect of SRS by modifying the idle transmission pattern in accordance with an exemplary embodiment of the present invention.

FIG. 4B is a block diagram illustrating the operating environment of a data service hub 400 in accordance with an alternative exemplary embodiment of the present invention. As illustrated in FIG. 4B, the idle pattern replacement device 425B, is located in the tap multiplexer 430. The tap multiplexer 430 can comprise a buffer (not illustrated) in this exemplary embodiment. In this alternative exemplary embodiment, the idle pattern replacement device 425B is implemented through hardware or software (or both) to produce an alternative idle code pattern as shown in FIG. 9 and discussed below.

Figure 5:
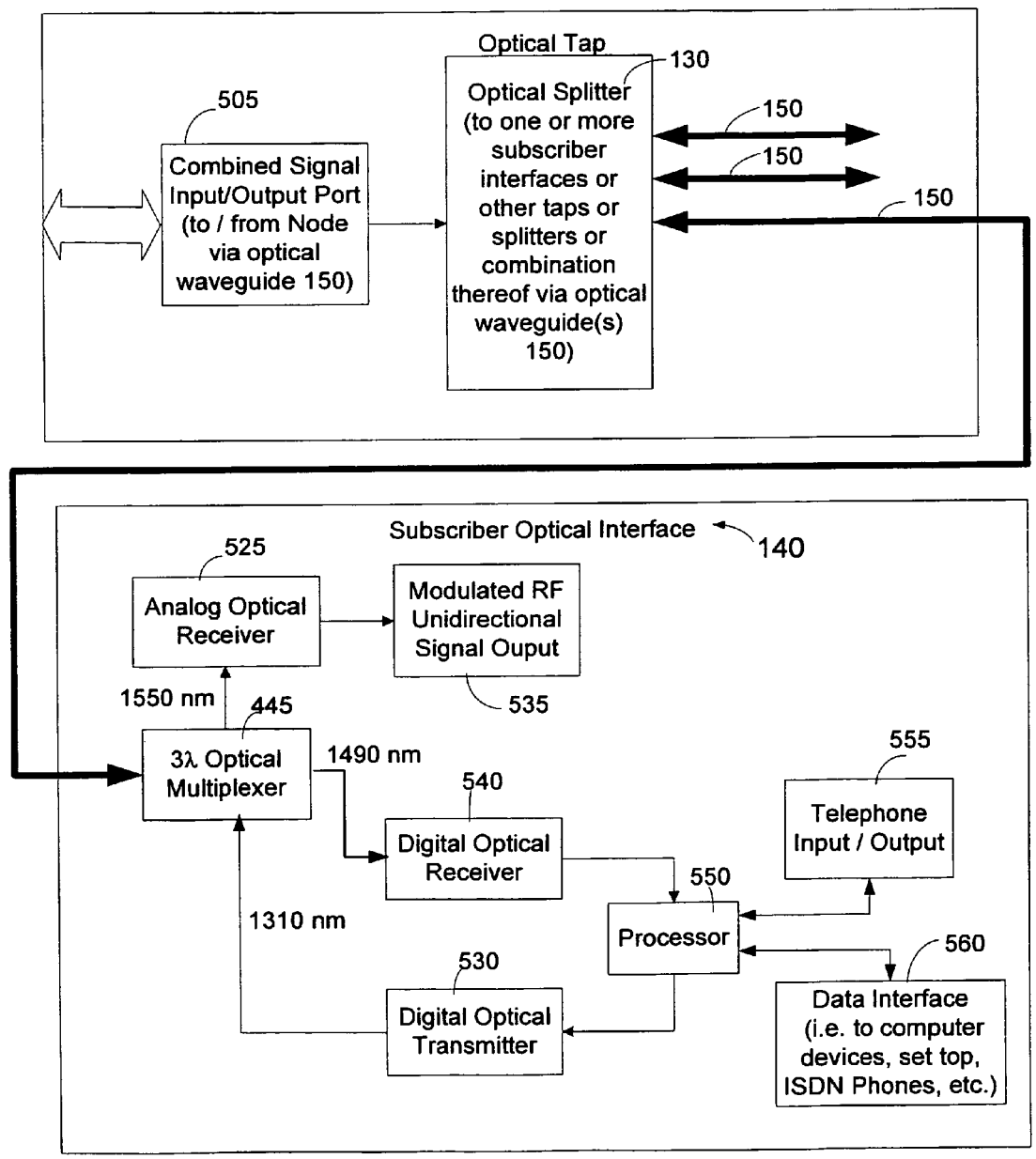
FIG. 5 is a block diagram illustrating the operating environment of the tap routing device and subscriber optical interface in accordance with an exemplary embodiment of the present invention.

FIG. 5 illustrates the Optical Splitter 130 and the Subscriber Optical Interface 140 according to one exemplary embodiment of the present invention. Optical signals enter the Combined Signal input/Output Port 505, and from there propagate to the Optical Tap or Splitter 130. There are multiple outputs from the Optical Tap or Splitter 130, one for each Subscriber Optical Interface 140 served by the instant Optical Tap 130. These are connected by Drop Fibers 150.

The Subscriber Optical Interface 140 comprises a three wavelength (3λ) Optical Multiplexer 445, which separates the three optical wavelengths, 1310 mn, 1490 nm, and 1550 nm, as did the corresponding device in the Data Service Hub 400. The 1550 nm broadcast signal is routed to an Analog Optical Receiver 525, and from there to a Modulated RF Unidirectional Signal Output 535 which connects to the subscriber's TVs and other suitable appliances known to one of ordinary skill in the art.

The 1490 nm downstream data is routed to a Digital Optical Receiver 540 then to a processor 550, which manages data signals and interfaces to Telephone Input/Outputs 555 and Data interfaces 560.

Figure 6:
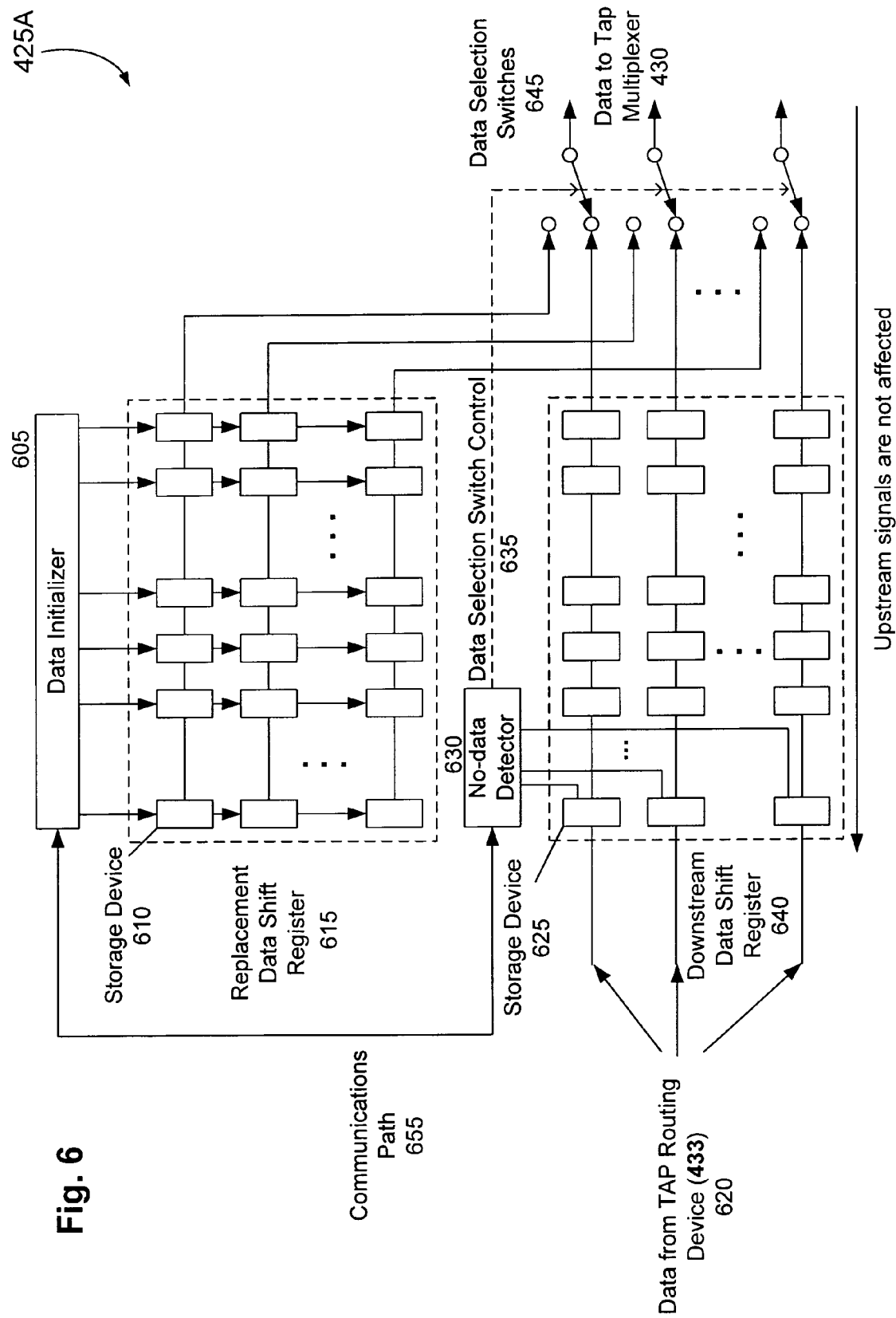
FIG. 6 is a block diagram illustrating the operating environment of the idle pattern replacement device in accordance with an exemplary embodiment of the present invention.

Referring now to FIG. 6, this figure is a block diagram illustrating the operating environment of the idle pattern replacement device 425A in accordance with an exemplary embodiment of the present invention. Clock synchronization that usually must take place is not illustrated in FIG. 6, but this is well-known to one of ordinary skill in the art.

The idle pattern replacement device 425A comprises a downstream data shift register 640 operating in the electrical domain, which accepts data 620 from the tap routing device 433. As is understood by one of ordinary skill in the art, data at this point is often handled in parallel format, whereby a number of bits (typically 8, 16, 32, or 64) are transferred simultaneously, or in parallel. Thus, downstream data shift register 640 is comprised of several sets of connected storage devices 625 that may comprise flip-flops, which are well known to one of ordinary skill in the art. For each bit in the parallel data transfer, data is shifted horizontally across the downstream data shift register 640. The purpose of the downstream data shift register 640 is to delay the start of each packet long enough to determine whether real data, or non-idle code data, is present, and if not, to allow random data to be inserted. If true data is present, then it is passed through to switches 645 and sent to the tap multiplexer 430.

If no data is being sent from the tap routing device 433, this no-data condition is detected by the no-data detector 630. The no-data detector 630 is coupled to each of the first stage storage devices in downstream data shift register 640, to allow it to detect when no data is present. Depending on the exemplary embodiment, a no-data condition can be represented by all 0s or 1s in the first stage of the shift register, or it can be represented by a unique data pattern, such as idle code. It could also be represented by the lack of a clock signal to shift data into the downstream data shift register 640 when the tap routing device 433 does not produce any idle code. In such an exemplary embodiment when the tap routing device 433 does not produce any idle code, the no-data detector 630 determines if an absence of data condition exists in which there is a lack of a clock signal or through pattern matching. When the no-data detector 630 is looking for the absence of data, it uses pattern matching to detect the absence of data. The absence of data typically comprises all 0s or 1s, which is well to known to one of ordinary skill in the art.

If the embodiment of the system is such that when no data is present, a fixed pattern of data 620 appears from the tap routing device, such as an idle code pattern, then the no-data detector 630 comprises a pattern recognition circuit known to one of ordinary skill in the art. The no-data detector 630 determines when the data pattern representing no real data or idle code pattern is present. Such a pattern recognition device can comprise a series of exclusive OR gates, for example, with an input from each exclusive OR gate connected to a 1 or a 0, depending on the pattern to be recognized. Furthermore, there are also software techniques for recognizing a pattern, like idle code patterns, which utilize the same process implemented in software that are well known in the art.

So long as data is present, then the no-data detector 630 controls the data selection switch control 635 to keep the data selection switches 645 in the positions shown so that the data is transmitted to the tap multiplexer 430. In this position, input data is supplied to the tap multiplexer 430 after a delay represented by the number of storage devices 610 connected horizontally in the downstream data shift register 640.

If a no-data condition is detected, then the data selection switches 645 are thrown to the opposite position, which connects the output to the replacement data shift register 615. This replacement data shift register 615 is similar to the downstream data shift register 640 except that it is loaded from a data initializer 605. The replacement shift register 615 contains data, such as inventive idle code, that is put in when no data is being transmitted, in order to prevent the tap multiplexer 430 from generating any conventional idle code patterns in exemplary embodiments in which the tap routing device 433 does not produce idle code patterns. As noted above, conventional idle code will cause the SRS problems as described above between downstream optical data signals of a first optical wavelength and downstream optical video signals at a second optical wavelength.

The data initializer 605 can be as simple as fixed preprogramming of the state of the storage devices 625 in the replacement data shift register 615. It can also be a microprocessor that can load data that is either pre-determined or downloaded or generated randomly by the microprocessor. A number of implementations are known to one of ordinary skill in the art and not beyond the scope of the invention.

The actual data loaded into the replacement data shift register 615 can be of a number of types. One type of data can be random numbers preceded by a code that tells the subscriber optical interface to ignore the data that follows in an Ethernet frame. Another type of data can be random data sent to a non-existent Ethernet MAC address, as is understood by one of ordinary skill in the art.

According to another exemplary embodiment of the present invention, random data is sent to a pre-determined set of non-existent MAC addresses such that there is minimal concentration of signal power at any one frequency. The set of non-existent MAC addresses can be selected from the range of MAC addresses that are assigned to each idle pattern replacement device 425A. Alternatively, the same set of non-existent MAC addresses can be assigned to all idle pattern replacement devices 425A. According to another exemplary aspect, an alternate idle code pattern, that complies with IEEE's 802.3ah standard, can be transmitted. All of these types of data can lessen the SRS optical interference and improve the quality of video transmissions.

The length of both the downstream data shift register 640 and the replacement data shift register 615 can be identical. The downstream data shift register 640 usually must delay any real data arriving after a period of no data, until the replacement data shift register 615 has shifted out its entire data. A normal Ethernet idle pattern is 20 bytes long, but the minimum length for a complete Ethernet frame is 64 bytes.

Thus, when an idle condition is detected and if the embodiment is such that random data is being sent to a non-existent MAC address, the output to the tap multiplexer 430 must comprise the 64 bytes of the packet being sent to the non-existent MAC address. If a real data packet comes along before the end of this 64 byte word, then the real data must be delayed in the downstream data shift register 640 until the end of the data being sent to the non-existent MAC address. The switches 645 are then thrown to the position shown, and the real data is shifted out.

If the random data being sent to the non-existent MAC address has all been shifted out and still there is no real data to be sent, then the Data Initializer 605 loads the Replacement Data Shift Register 615 with a new set of random data and a non-existent MAC address, and the process begins again. Because of this possibility (multiple packets of random data sent to non-existent MAC addresses sequentially), according to one exemplary embodiment, it is preferred to use a plurality of random non-existent MAC addresses, to prevent a common address from forcing a spectral peak. As soon as new real data is presented to Downstream Data Shift Register 640, then at the completion of the current random data packet being sent to the non-existent MAC address, the real data is transmitted. A Communications Path 655 between the No-data Detector 630 and the Data Initializer 605 facilitates coordination between the data initializer 605 and the no-data detector 630 of the Idle Pattern Replacement Device 425A.

Figure 7:
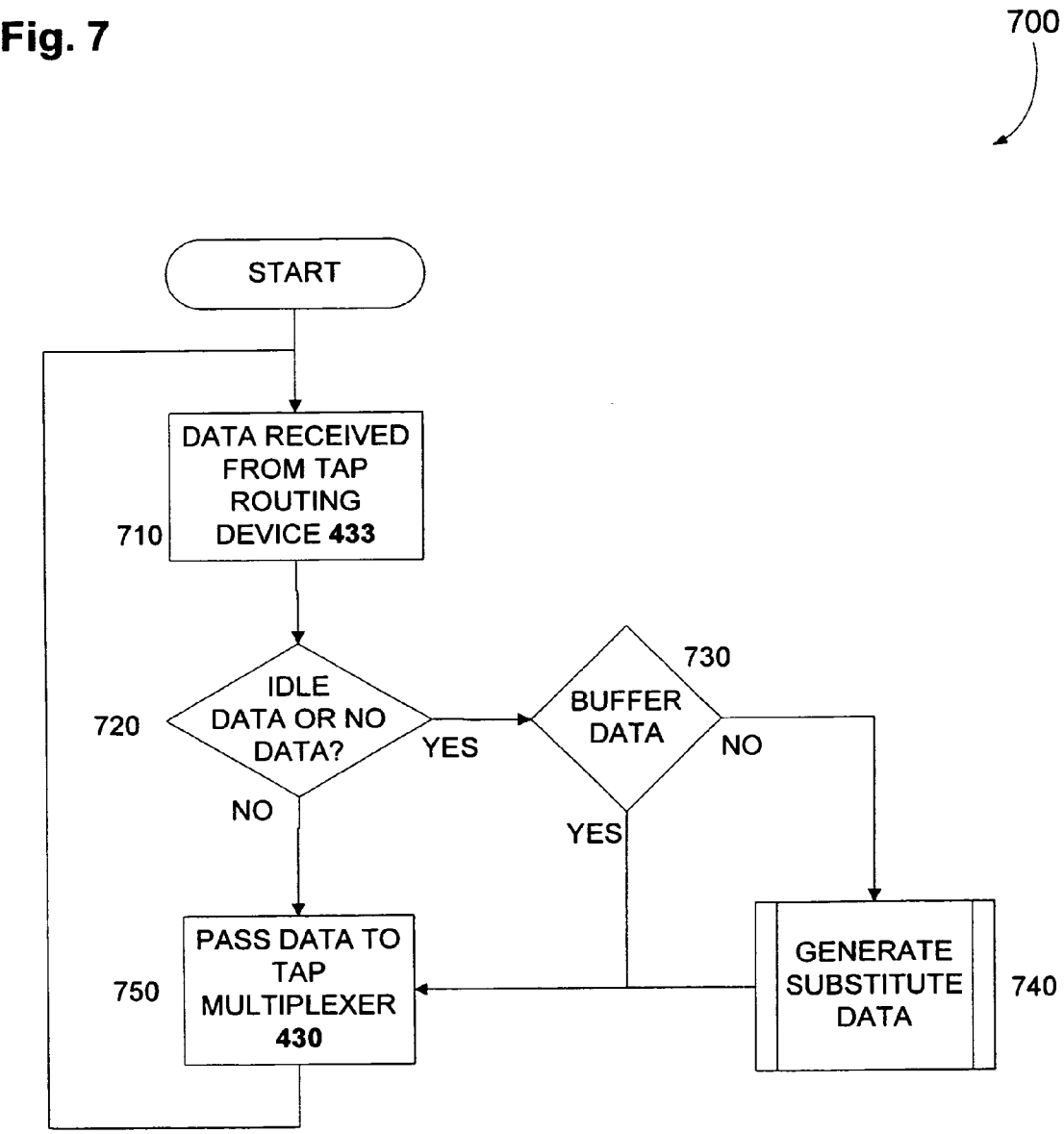
FIG. 7 is a logic flow diagram illustrating an exemplary method for reducing the effect of SRS by generating substitute data in accordance with an exemplary embodiment of the present invention.

Referring now to FIG. 7, this Figure is a flow chart depicting an exemplary method 700 for reducing the effect of SRS by generating non-repetitive substitute data in accordance with an exemplary embodiment of the present invention. In Step 710, the idle pattern replacement device 425A receives input from the tap routing device 433. In step 720, the idle pattern replacement device 425A examines the input data to determine whether an idle code pattern is being transmitted or whether there is no data. The operation of detecting an idle code pattern can be performed by a pattern match to analyze two bytes of the data and determine whether the data matches the idle pattern.

If the idle pattern replacement device 425A determines that an idle pattern is not being transmitted in Step 720, the data is transmitted to the tap multiplexer 430 in Step 750. This data is transferred through Downstream Data Shift Register 640. However, if the idle pattern replacement device 425A determines that an idle pattern (or no data, depending on the embodiment) is being transmitted in Step 720, the idle pattern replacement device will need to transmit substitute non-repetitive data to the tap multiplexer 430. First, the idle pattern replacement device 425A will determine if real data from a previous packet is being held within the Downstream Data Shift Register 640 in Step 730. If the Downstream Data Shift Register 640 contains real data from a previous packet, that data will be transmitted to the tap multiplexer 430 in Step 750. If the buffer does not contain real data from a previous packet, the Data Initializer 605 will generate substitute data in Routine 740, which will be transmitted to the tap multiplexer 430 in Step 750, by way of Replacement Data Shift Register 615.

In an alternative exemplary embodiment, in Step 710, the idle pattern replacement device 425B of FIG. 4B receives input from the tap routing device 433. In step 720, the idle pattern replacement device 425B examines the input data to determine whether an idle code pattern is being transmitted. The operation of detecting an idle code pattern can be performed by a pattern match to analyze one or more bytes of the data and determine whether the data matches the idle pattern. If the idle pattern replacement device 425B determines that an idle pattern is not being transmitted in Step 720, the data is transmitted to the tap multiplexer 430 in Step 750; otherwise, the idle pattern replacement device will need to transmit an alternative idle code pattern to the tap multiplexer 430.

In Step 730, the idle pattern replacement device 425B will determine if any real data from a previous packet is stored in a buffer. If the idle pattern replacement device 425B determines that any real data from a previous packet is stored in a buffer in Step 730, the data is transmitted to the tap multiplexer 430 in Step 750; otherwise, the method proceeds to Step 740 to generate an alternative idle code pattern.

In Step 740, the idle code replacement device 425B generates an alternative idle code pattern and transmits the alternative idle code pattern to the tap multiplexer 430 in Step 750. More specific details related to the generation of an alternative idle code pattern are shown in FIG. 9 and discussed below.

Figure 8:
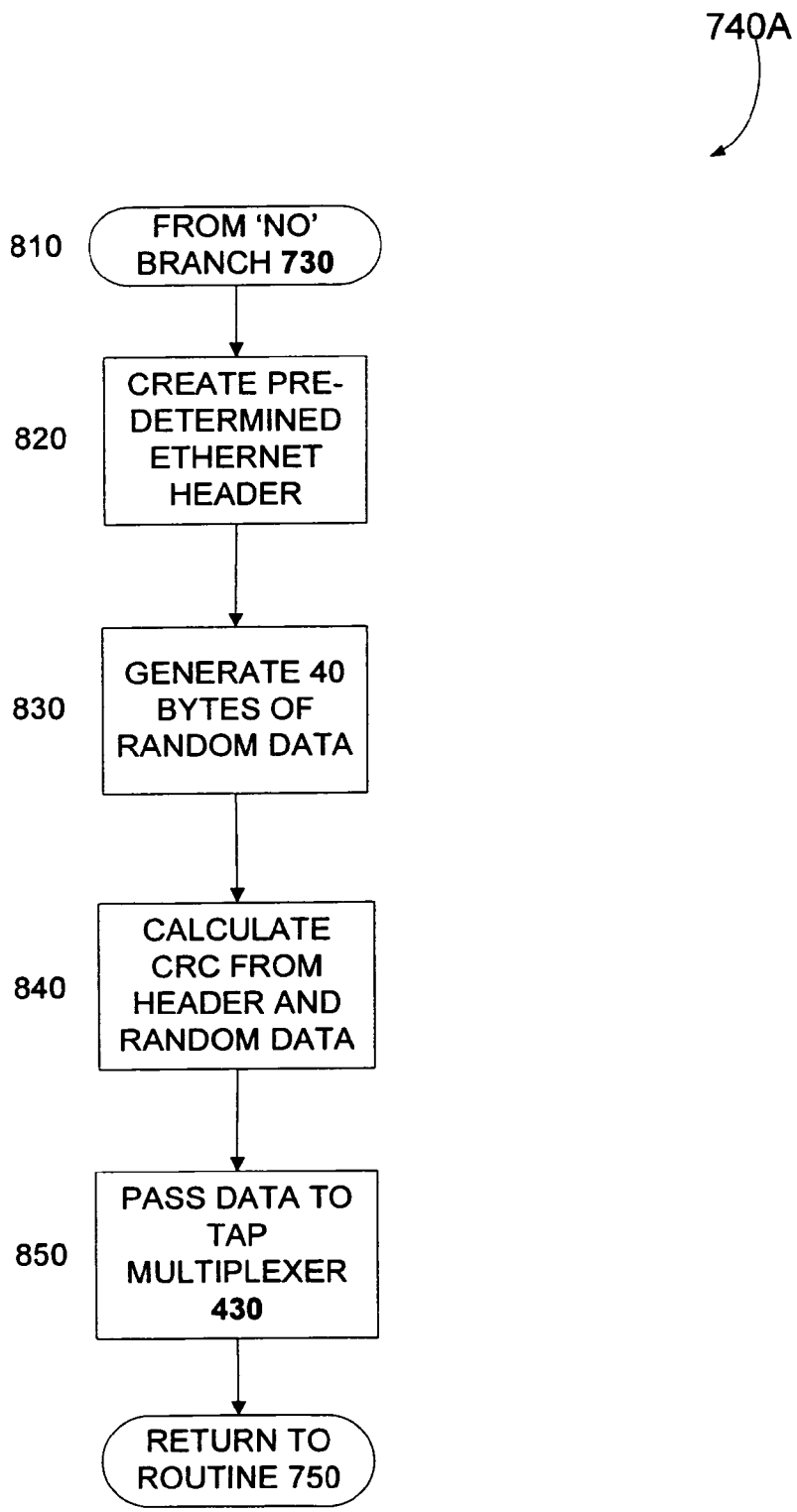
FIG. 8 is a logic flow diagram illustrating an exemplary method for reducing the effect of SRS by generating non-repetitive random data and transmitting it to a non-existent MAC address in accordance with an exemplary embodiment of the present invention.

FIG. 8 is a flow chart depicting a first exemplary Routine 740A for reducing the effect of SRS by generating non-repetitive random data and transmitting it to a non-existent MAC address in accordance with an exemplary embodiment of the present invention. In Step 810, the idle pattern replacement device 425A has determined in Step 730 that it must generate substitute data because no real data is available. In Step 820, the idle pattern replacement device 425A creates a predetermined Ethernet header.

The header is based on a group of non-existent or reserved MAC addresses stored in the Data Initializer 605. The creation of Ethernet headers are well known in the art. Next, in Step 830, the idle pattern replacement device 425A generates forty (40) bytes of random substitute data. In Step 840, the idle pattern replacement device 425A performs a cyclical redundancy check (CRC) based on the previously created header and random data. Performing a CRC is an optional step because it does not matter whether this packet of substitute data is actually delivered to an actual MAC address, as it is just random data, but the CRC is part of the Ethernet standard. Finally, in step 850 the data is passed to the tap multiplexer 430 for transmission.

Combining the Ethernet header, random substitute data, and CRC from Routine 740A can add up to sixty-four (64) bytes of data that is to be transmitted to the tap multiplexer 430. Only two (2) bytes of data must be read to determine whether an idle pattern is being transmitted. Therefore, in method 700, two (2) bytes of idle pattern data could be sent that could trigger Routine 740 to begin creating sixty-four (64) bytes of data to be transmitted to the tap multiplexer 430. In the meantime, bytes of real data could be transmitted from the optical routing device 433 to the idle pattern replacement device 425A.

However, instead of immediately transferring the real data to the tap multiplexer 430, the real data is held in a buffer until the entire sixty-four (64) bytes of random substitute data is transmitted to the tap multiplexer 430. It should be noted that in the exemplary method 700, the No-data Detector 630 is continuously monitoring the incoming data to determine whether idle pattern data or real data is being transferred. The continuous monitoring of Data 620 allows any real data that immediately follows any idle pattern data to be stored, or buffered, in Downstream Data Shift Register 640 until all random substitute data is transmitted to the tap multiplexer 430. Furthermore, the buffer allows the continuous storage of random substitute data that can immediately be transferred to the tap multiplexer 430 when an idle pattern is detected.

FIG. 9 is a flow chart depicting an alternate exemplary method 740B for reducing the effect of SRS by modifying the idle transmission pattern in accordance with an alternate exemplary embodiment of the present invention. As previously discussed, the IEEE 802.3ah standard defines two different idle codes: (1) /I1−/ (running disparity from negative to positive) and /I1+/ (running disparity from positive to negative); and (2) /I2/ (normal running disparity). Idle codes /I1−/ and /I1+/ must be transmitted as a pair to keep the disparity consistent with the requirements of the standard. This relates to keeping the number of 1s and 0s transmitted equal. One of ordinary skill in the art knows that it is imperative to keep the number of 1s and 0s transmitted equal, to remove any dc component from the data. The continuous transmission of the /I2/ code group, as defined by the standard, has a significant effect on interference from SRS. Therefore, to overcome the effects of the SRS optical interference, the continuous transmission of the I2 code group can be eliminated without violating the 802.3ah standard.

In Step 910, the idle code replacement device 425B has determined in Step 720 that it must generate substitute data because an idle pattern code is being transmitted and there is no waiting data available in a buffer in Step 730. If there is waiting data in a buffer, it is sent to the tap multiplexer 430 before the routine of FIG. 9 is entered.

In Step 920, the last frame transmitted is checked to see if it had a positive running disparity. If so, Step 920 is exited through the YES path and a single /I1+/ is transmitted to reverse the running disparity as required by the IEEE 802.3ah standard. After Step 920, the method proceeds to Step 940. Furthermore, Step 940 is also entered if the result of Step 920 is NO. In Step 940, a random bit, either a 1 or a 0, is generated, with equal probability of the random bit being 1 or 0. In Step 950, that random bit is examined to see if it is a 1 or a 0. If the random bit is a 0, then Step 950 is exited at the YES outlet, and a normal idle pattern, /I2/ is transmitted in Step 960. If the random bit is a 1, then Step 950 is exited at the NO outlet, and a pair of idle patters, /I1+/ followed by /I1−/, are transmitted in Step 970.

After transmitting either /I2/ in Step 960 or the pair /I1+/ and /I1−/ in Step 970, the routine returns to Step 750. In Step 750, the idle pattern is passed to Tap Multiplexer 430, then control passes back to Step 710, where the incoming data is again examined to see if there is real data to be transmitted, or whether another idle code must be generated.

Figure 10:
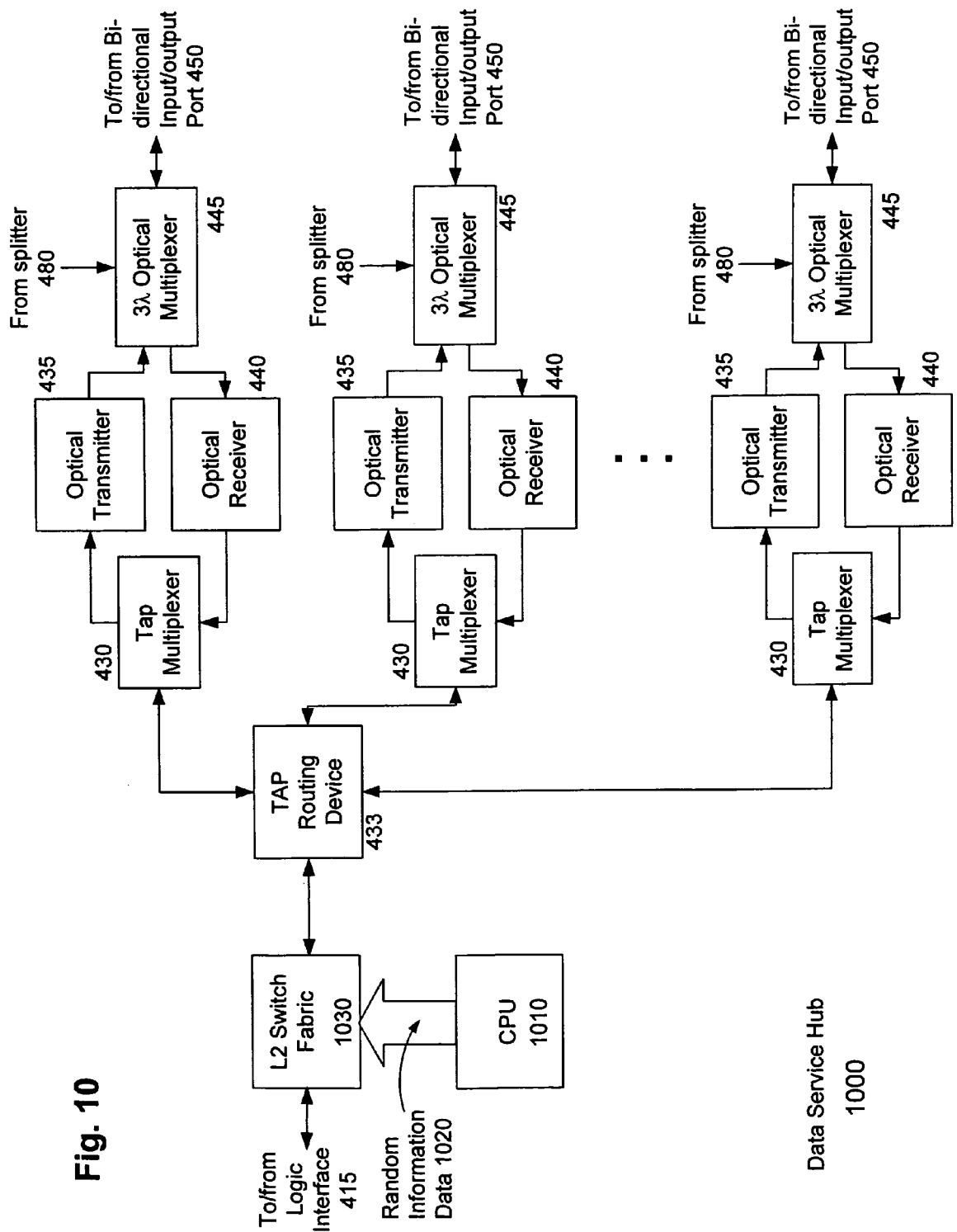
FIG. 10 is a block diagram illustrating the operating environment of a data service hub in accordance with an alternative exemplary embodiment of the present invention.

FIG. 10 is a block diagram illustrating the relevant portions of an alternative operating environment of a data service hub 400 in accordance with an exemplary embodiment of the present invention. Data is received from the logic interface 415 at an L2 (Layer 2, meaning in this case Ethernet) switch fabric 1030. Data received from the logic interface 415 will typically comprise either real data or an absence of data. The L2 switch fabric 1030 uses pattern matching to detect the absence of data. The absence of data typically comprises all 0s or 1s, which is well to known to one of ordinary skill in the art. This switch fabric may be part of Tap Routing Device 433. In this case, the L2 Switch Fabric 1030 simply represents another port on the switch that is part of the Tap Routing Device 433, with the new port being used to accept data from CPU 1010. As the L2 switch fabric 1030 continues to receive data from the network, the CPU 1010, or other special purpose circuitry, continuously produces bytes of random information data 1020. The CPU 1010 transmits the bytes of random information data 1020 to the L2 switch fabric 1030. The L2 switch fabric 1030 processes the data received from the logic interface 415 and the random information data 1020 and transmits the appropriate data to the tap routing device 433, in accordance with an exemplary method discussed in FIG. 11 below.

Figure 11:
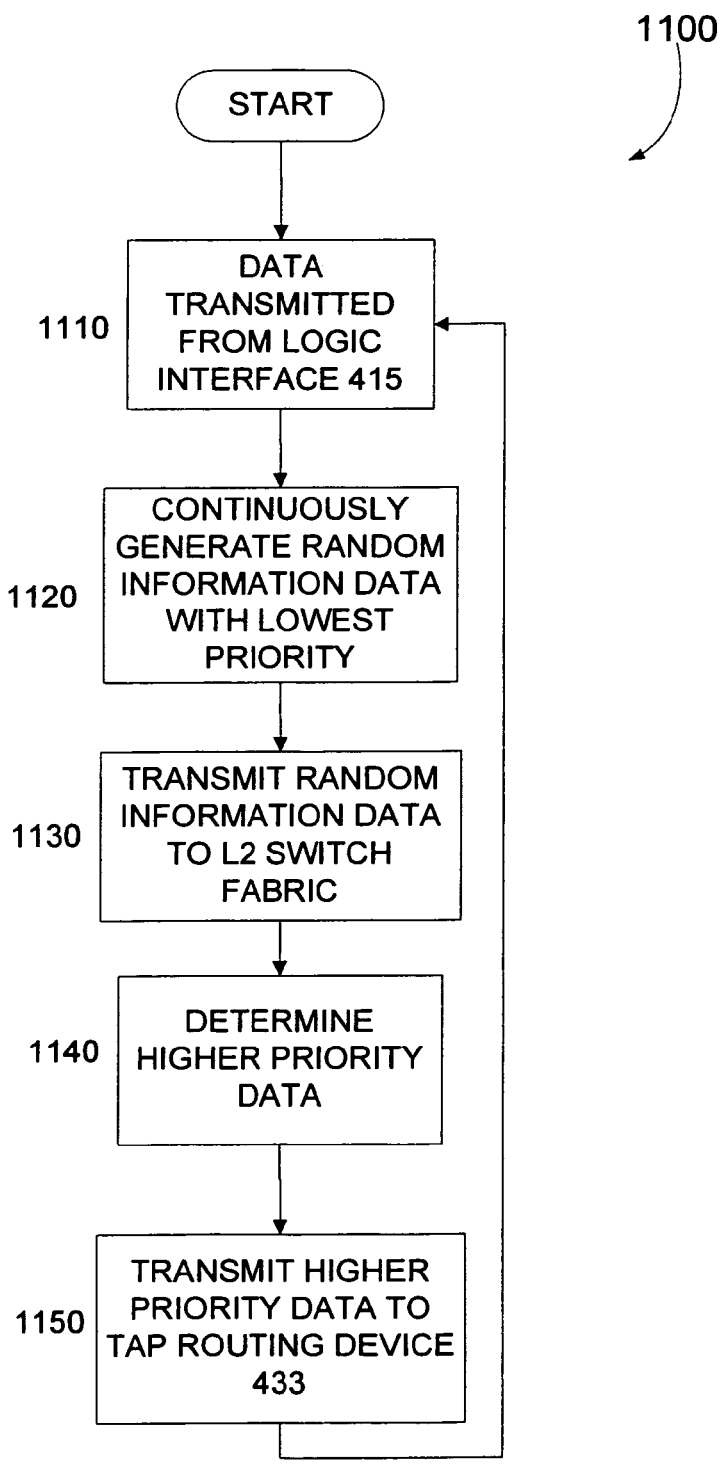
FIG. 11 is a logic flow diagram illustrating an alternative exemplary method for reducing the effect of SRS by generating non-repetitive random data and transmitting it to a non-existent MAC address in accordance with an exemplary embodiment of the present invention.

Referring now to FIG. 11, this figure is a flow chart depicting an alternative exemplary method 1100 for reducing the effect of SRS by generating non-repetitive random data and transmitting it to a non-existent MAC address in accordance with an exemplary embodiment of the present invention. In Step 1110, data is transmitted from the logic interface 415 to an L2 switch fabric 1030. In Step 1120, the CPU 1010, or other special purpose circuitry, continuously generates bytes of random information data 1020, assigning the lowest possible priority to that data 1020. In Step 1130, the CPU 1010 transmits the bytes of random information data 1020 to the L2 switch fabric 1030. As well known in the art, Ethernet frames allow priority information to be inserted with the data that is being transmitted. Therefore, according to this exemplary embodiment, the random information data 1020 transmitted from the CPU 1010 is set to the lowest priority value for Ethernet frames.

In Step 1140, the L2 switch fabric 1030 selects between normal incoming data from 415 or random information data 1020 from the CPU 1010. The L2 switch fabric 1030 always processes the data such that higher-priority data is transmitted before lower priority data is transmitted. The random information data 1020 from the CPU 1010 is sent as the lowest-priority data, and thus, the only time it will be transmitted is when there is no data available from the logic interface 415. In Step 1150, the L2 switch fabric 1030 transmits the data with the higher priority value to the tap routing device 433. The data with higher priority will always be the data from the logic interface 415 if there is any real data to transmit, so that the only time the random information data 1020 from the CPU 1010 will be transmitted is if there is no data from the logic interface 415 ready to be transmitted.

Therefore, when no real data is being received from the logic interface 415, the L2 switch fabric 1030 will forward the previously created random information data 1020 to the tap routing device 433. Similar to FIG. 8, along with the creation of the random information data 1020, the CPU 1010 will also create an Ethernet header frame and perform a cyclical redundancy check (CRC) based on the previously created Ethernet header frame and random data. However, when real data is being received from the logic interface 415, it is transferred to the tap routing device 433 because it is assigned a higher priority than the random information data 1020.

Figure 12:
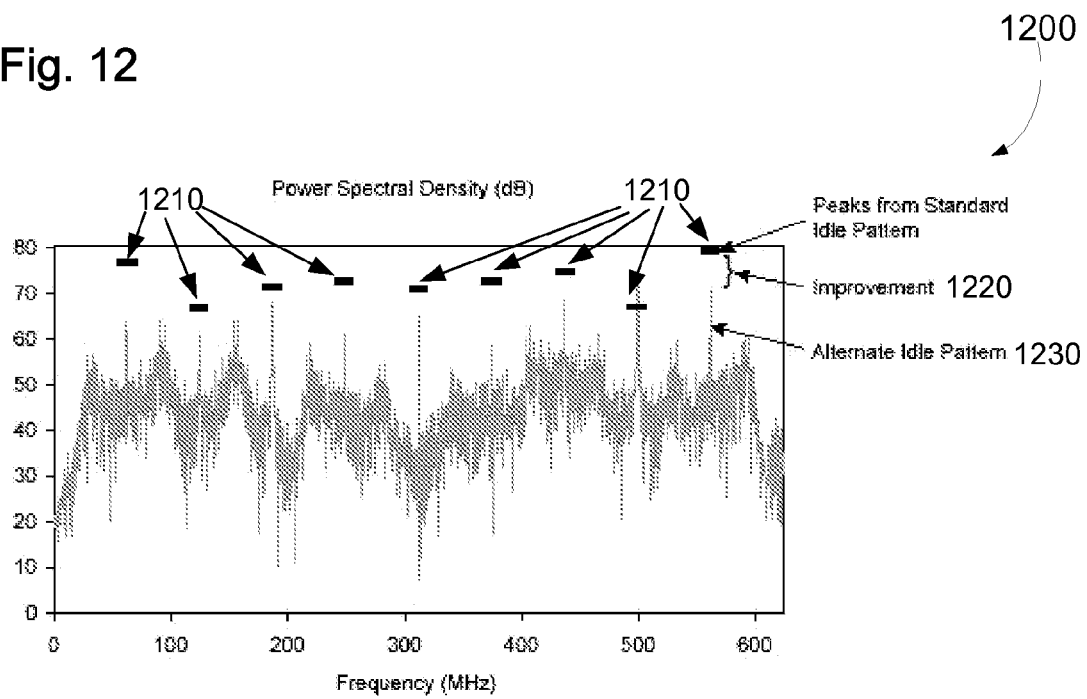
FIG. 12 is a graph illustrating the reduction of the power spectrum of an idle Ethernet link using the alternate idle code strategy in accordance with an exemplary embodiment of the present invention.

Referring now to FIG. 12, this figure illustrates a graph 1200 representing the power spectrum of an idle Ethernet link. The Ethernet link is the link from the Optical Transmitter 435 to Digital Optical Receiver 540. As well known in the art, the Ethernet link could be any other Ethernet link that uses idle frames, such as 1 Gb/s fiber optic links. However, in this example, the Ethernet link is conforming to a particular standard, the IEEE 802.3ah standard, which uses the exemplary alternate idle code strategy as illustrated in FIG. 9. The x-axis of the graph 1200 denotes frequency in MHz while the y-axis denotes power measured in decibels (dB). The link transmits the /I1−/I1+/ patterns with probability 0.33. The graph 1200 shows the spectral peaks of the traditional idle pattern 1210 using short horizontal bars and the spectral peaks of the alternate idle pattern 1230 and the improvement 1220 between the two. The alternate idle code approach provides significant improvement over the conventional idle code. As shown, the graph represents the power spectrum of an idle Ethernet link measured in the electrical domain representing the SRS reduction in the optical domain. However, it is clear to one of ordinary skill in the art, that the idle code pattern modification as disclosed in the present invention will provide significant improvement over the conventional idle code in both the electrical and optical domains. Therefore, the invention can reduce any interference between video and data signals that occur due to idle code transmissions in either the electrical or optical domains (or both).

While, it is not easy to show the effect of the embodiment of FIGS. 10 and 11, it is clear to one of ordinary skill in the art that the improvement will be even more dramatic than the improvement illustrated in FIG. 12 because random data is being transmitted, and as is understood by one of ordinary skill in the art, random data has no spectral peaks such as 1210 in FIG. 12. On the other hand, the embodiment of FIGS. 10 and 11 involves a more complex modification to Tap Routing Device 433, and involves a longer time during which real data cannot be transmitted should it present itself during transmission of the countermeasure taught in this Patent Application.

It should be understood that the foregoing relates only to illustrative exemplary embodiments of the present invention, and that numerous changes may be made therein without departing from the scope and spirit of the invention as defined by the following claims.

What is claimed is:

1. A method for mitigating the effects of optical interference from optical data signals comprising the steps of:
    receiving electrical input with a detector;
    determining whether the electrical input comprises data with the detector and if the electrical input comprises data, then converting the data from an electrical domain to a digital optical domain with an optical transmitter;
    determining whether the input comprises one of an absence of data and an idle pattern with the detector;
    if the input comprises one of an absence of data and an idle pattern, generating substitute data in an electrical domain with a replacement data device that reduces power at one or more harmonics in the electrical domain such that a concentration of power in the digital optical domain is minimized when the substitute data is converted into the digital optical domain;
    maintaining power to the optical transmitter during an absence of data or after receiving an idle pattern;
    in response to detecting one of an absence of data and an idle pattern with the detector, converting the substitute data from the electrical domain to the digital optical domain with the optical transmitter so that data transmission in the digital optical domain is substantially continuous when the input comprises one of an absence of data and an idle pattern; and
    propagating the substitute data in the digital optical domain.

2. The method of claim 1, wherein propagating the substitute data in the digital optical domain further comprises propagating the substitute data in the digital optical domain along with other optical signals in an analog optical domain through a single optical waveguide, the substitute data in the digital optical domain comprising minimal concentration of optical power for reducing any optical interference between the substitute data and the other optical signals caused by physical properties of the single optical waveguide combined with selected optical wavelengths and optical power of the substitute data and the other optical signals.

3. The method of claim 2, wherein propagating the substitute data in the digital optical domain along with other optical signals in an analog optical domain through a single optical waveguide comprises propagating the substitute data in the digital optical domain along with video information in an analog optical domain.

4. The method of claim 1, wherein receiving input comprises receiving input from a routing device.

5. The method of claim 1, wherein the step of generating substitute data further comprises generating non-repetitive random data and assigning the random data to a non-existent MAC address.

6. The method of claim 1, wherein the step of generating substitute data further comprises alternating between different idle code pairs based upon a random variable function.

7. The method of claim 1, wherein determining whether the input comprises one of an absence of data and an idle pattern comprises determining whether the input comprises one of an absence of data and an idle pattern with a pattern recognition circuit.

8. The method of claim 1, wherein generating substitute data in an electrical domain that reduces power at one or more harmonics in the electrical domain comprises generating the substitute data with a shift register.

9. A method for reducing optical interference between data and other information propagated over a single optical waveguide comprising:
    monitoring input in an electrical domain with a detector;
    determining whether the input in the electrical domain comprises data with the detector and if the input in the electrical domain comprises data, then converting the data from an electrical domain to a digital optical domain with an optical transmitter;
    determining if the input in the electrical domain comprises one of an absence of data and an idle pattern with the detector;
    generating substitute data in the electrical domain with a replacement data device that reduces power at one or more harmonics in the electrical domain such that a concentration of energy in the digital optical domain is minimized when the substitute data is converted into the digital optical domain;
    if the input comprises one of an absence of data and an idle pattern code, then converting the substitute data into the digital optical domain by modulating the substitute data on a digital optical carrier with a first optical wavelength so that data transmission in the digital optical domain is substantially continuous when the input comprises one of an absence of data and an idle pattern;
    maintaining power to the optical transmitter during an absence of data or after receiving an idle pattern; and
    propagating the digital optical carrier along an optical waveguide, wherein the substitute data in the digital optical domain comprises minimal concentration of optical power for substantially reducing optical interference within the optical waveguide.

10. The method of claim 9, further comprising:
    receiving information in an electrical domain; and
    converting the information into an analog optical domain by modulating the information on an analog optical carrier having a second optical wavelength.

11. The method of claim 10, further comprising:
    combining the analog and digital optical carriers; and
    propagating the analog and digital optical carriers along the optical waveguide.

12. The method of claim 10, wherein the information comprises video information.

13. The method of claim 9, wherein the step of generating substitute data further comprises generating non-repetitive random data and assigning the random data to a non-existent MAC address.

14. A method for reducing optical interference in a single optical waveguide comprising:
    generating random data assigned with a low priority that reduces power at one or more harmonics in the electrical domain such that a concentration of power in a digital optical domain is minimized when the random data is converted into the digital optical domain;

determining if any higher priority data is present for digital optical transmission;

if higher priority data is not present, then inserting the random data with the low priority for digital optical transmission so that data transmission in the digital optical domain is substantially continuous when higher priority data is not present;

converting the random data into the digital optical domain with an optical transmitter by modulating the random data on a digital optical carrier; and maintaining power to the optical transmitter for low priority data, high priority data, and during any absence of data.

15. The method of claim 14, wherein the digital optical carrier has a first optical wavelength, the method further comprising converting information other than data into an analog optical domain by modulating the other information on an analog optical carrier with a second optical wavelength.

16. The method of claim 15, further comprising combining the analog and digital optical carriers.

17. The method of claim 15, further comprising propagating the analog and digital optical carriers along the single optical waveguide wherein the random data comprising minimal concentration of optical power substantially reduces any optical interference between the analog and digital optical carriers caused by physical properties of the single optical waveguide combined with selected optical wavelengths and optical power of the random data and other information.

18. The method of claim 15, wherein the information other than data comprises video information.

* * * * *